US010241712B1

(12) United States Patent
Elliott, IV et al.

(10) Patent No.: US 10,241,712 B1
(45) Date of Patent: Mar. 26, 2019

(54) METHOD AND APPARATUS FOR AUTOMATED ORCHESTRATION OF LONG DISTANCE PROTECTION OF VIRTUALIZED STORAGE

(71) Applicant: EMC Corporation, Hopkinton, MA (US)

(72) Inventors: William J. Elliott, IV, Holden, MA (US); Bradley J. Hughes, Moncton (CA); Sean R. Gallacher, Moncton (CA); Bharath Sreekanth, Shrewsbury, MA (US); Anoop Ninan, Milford, MA (US); Joseph A. Condlin, Medway, MA (US); Michael G. Hegerich, Holliston, MA (US); Thomas L. Watson, Richardson, TX (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 14/319,772

(22) Filed: Jun. 30, 2014

(51) Int. Cl.
  *G06F 3/06* (2006.01)
(52) U.S. Cl.
  CPC ............ *G06F 3/065* (2013.01); *G06F 3/0604* (2013.01); *G06F 3/067* (2013.01); *G06F 3/0665* (2013.01)

(58) Field of Classification Search
  CPC ................................ G06F 12/00; G06F 13/00
  See application file for complete search history.

(56) References Cited

U.S. PATENT DOCUMENTS

| | | | | |
|---|---|---|---|---|
| 5,937,414 | A | * | 8/1999 | Souder .............. G06F 17/30286 707/616 |
| 2003/0079019 | A1 | * | 4/2003 | Lolayekar ........... H04L 67/1097 709/226 |
| 2004/0153719 | A1 | * | 8/2004 | Achiwa ............... G06F 11/2041 714/6.32 |
| 2005/0108292 | A1 | * | 5/2005 | Burton .................. G06F 3/0608 |
| 2005/0203972 | A1 | * | 9/2005 | Cochran ............. G06F 11/2058 |
| 2007/0079060 | A1 | * | 4/2007 | Burkey ................ G06F 3/0605 711/112 |
| 2010/0082900 | A1 | * | 4/2010 | Murayama ........... G06F 3/0608 711/114 |
| 2013/0013566 | A1 | * | 1/2013 | Miller ................. G06F 11/2069 707/655 |

* cited by examiner

*Primary Examiner* — Tuan V Thai
(74) *Attorney, Agent, or Firm* — Krishnendu Gupta

(57) ABSTRACT

Example embodiments of the present invention relate to a method, a system, and a computer program product for replicating a virtual volume. The method includes creating a volume in a first datacenter, the volume in the first datacenter accessible as a virtual volume exposed to the first datacenter and a second datacenter, and establishing replication of the virtual volume to a third datacenter.

17 Claims, 31 Drawing Sheets

METHOD AND APPARATUS FOR AUTOMATED ORCHESTRATION OF LONG DISTANCE PROTECTION OF VIRTUALIZED STORAGE

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data replication.

RELATED APPLICATIONS

This Application is related to U.S. patent application Ser. No. 13/630,455 entitled "SINGLE CONTROL PATH", Ser. No. 13/631,030 entitled "METHOD AND APPARATUS FOR FEDERATING A PLURALITY OF ONE BIG ARRAYS", Ser. No. 13/631,039 entitled "METHOD AND APPARATUS FOR AUTOMATED INFORMATION LIFECYCLE MANAGEMENT USING A FEDERATION OF ARRAYS", Ser. No. 13/631,055 entitled "METHOD AND APPARATUS FOR FEDERATED IDENTITY AND AUTHENTICATION SERVICES", Ser. No. 13/631,190 entitled "APPLICATION PROGRAMMING INTERFACE", Ser. No. 13/631,214 entitled "AUTOMATED POLICY BASED SCHEDULING AND PLACEMENT OF STORAGE RESOURCES", and Ser. No. 13/631,246 entitled "DISTRIBUTED SYSTEM SOFTWARE INFRASTRUCTURE" filed on Sep. 28, 2012; Ser. No. 13/886,644 entitled "STORAGE PROVISIONING IN A DATA STORAGE ENVIRONMENT", Ser. No. 13/886,786 entitled "DISTRIBUTED WORKFLOW MANAGER", Ser. No. 13/886,789 entitled "PORT PROVISIONING SYSTEM", Ser. No. 13/886,892 entitled "SCALABLE INDEX STORE", Ser. No. 13/886,687 entitled "STORAGE PROVISIONING IN A DATA STORAGE ENVIRONMENT", and Ser. No. 13/886,915 entitled "SCALABLE OBJECT STORE" filed on May 3, 2013; and Ser. No. 14/319,757, now U.S. Pat. No. 9,612,769, issued Apr. 4, 2017 entitled "METHOD AND APPARATUS FOR AUTOMATED MULTI SITE PROTECTION AND RECOVERY FOR CLOUD STORAGE", Ser. No. 14/315,438 entitled "GLOBAL STORAGE RESOURCE MANAGMENET", Ser. No. 14/319,777, now U.S. Pat. No. 10,001,939, issued Jun. 19, 2018 entitled "METHOD AND APPARATUS FOR HIGHLY AVAILABLE STORAGE MANAGEMENT USING STORAGE PROVIDERS", Ser. No. 14/319,797, now U.S. Pat. No. 9,940,073, issued Apr. 10, 2018 entitled "METHOD AND APPARATUS FOR AUTOMATED SELECTION OF A STORAGE GROUP FOR STORAGE TIERING", Ser. No. 14/319,804, now U.S. Pat. No. 9,933,967, issued Apr. 3, 2018 entitled "METHOD AND APPARATUS FOR STORAGE MANAGEMENT USING VIRTUAL STORAGE ARRAYS AND VIRTUAL STORAGE POOLS", and Ser. No. 14/313,104, now U.S. Pat. No. 9,710,194, issued Jul. 18, 2017 entitled "STORAGE PORT ALLOCATION BASED ON INITIATOR USAGE" filed on even date herewith, which are hereby incorporated herein by reference in their entirety.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices or logical volumes. The logical disk units may or may not correspond to the actual physical disk drives. Allowing multiple host systems to access the single storage device unit allows the host systems to share data stored therein. In a common implementation, a Storage Area Network (SAN) is used to connect computing devices with a large number of storage devices. Management and modeling programs may be used to manage these complex computing environments.

Two components having connectivity to one another, such as a host and a data storage system, may communicate using a communication connection. In one arrangement, the data storage system and the host may reside at the same physical site or location. Techniques exist for providing a remote mirror or copy of a device of the local data storage system so that a copy of data from one or more devices of the local data storage system may be stored on a second remote data storage system. Such remote copies of data may be desired so that, in the event of a disaster or other event causing the local data storage system to be unavailable, operations may continue using the remote mirror or copy.

In another arrangement, the host may communicate with a virtualized storage pool of one or more data storage systems. In this arrangement, the host may issue a command, for example, to write to a device of the virtualized storage pool. In some existing systems, processing may be performed by a front end component of a first data storage system of the pool to further forward or direct the command to another data storage system of the pool. Such processing may be performed when the receiving first data storage system does not include the device to which the command is directed. The first data storage system may direct the command to another data storage system of the pool which includes the device. The front end component may be a host adapter of the first receiving data storage system which receives commands from the host.

Often cloud computing may be performed with a data storage system. As it is generally known, "cloud computing" typically refers to the use of remotely hosted resources to provide services to customers over one or more networks such as the Internet. Resources made available to customers are typically virtualized and dynamically scalable. Cloud computing services may include any specific type of application. Some cloud computing services are, for example, provided to customers through client software such as a Web browser. The software and data used to support cloud computing services are located on remote servers owned by a cloud computing service provider. Customers consuming services offered through a cloud computing platform need not own the physical infrastructure hosting the actual service, and may accordingly avoid capital expenditure on hardware systems by paying only for the service resources they use, and/or a subscription fee. From a service provider's standpoint, the sharing of computing resources across multiple customers (aka "tenants") improves resource utilization. Use of the cloud computing service model has been growing due to the increasing availability of high bandwidth communication, making it possible to obtain response times from remotely hosted cloud-based services similar to those of services that are locally hosted.

Cloud computing infrastructures often use virtual machines to provide services to customers. A virtual machine is a completely software-based implementation of a computer system that executes programs like an actual computer system. One or more virtual machines may be used to provide a service to a given customer, with additional virtual machines being dynamically instantiated and/or allocated as customers are added and/or existing customer requirements change. Each virtual machine may represent all the components of a complete system to the program code running on it, including virtualized representations of processors, memory, networking, storage and/or BIOS (Basic Input/Output System). Virtual machines can accordingly run unmodified application processes and/or operating systems. Program code running on a given virtual machine executes using only virtual resources and abstractions dedicated to that virtual machine. As a result of such "encapsulation," a program running in one virtual machine is completely isolated from programs running on other virtual machines, even though the other virtual machines may be running on the same underlying hardware. In the context of cloud computing, customer-specific virtual machines can therefore be employed to provide secure and reliable separation of code and data used to deliver services to different customers.

Conventional data protection systems include tape backup drives, for storing organizational production site data on a periodic basis. Such systems suffer from several drawbacks. First, they require a system shutdown or cause a system state degradation during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to run in an unprotected state until such a time where it can recover from the congestion.

SUMMARY

Example embodiments of the present invention relate to a method, a system, and a computer program product for replicating a virtual volume. The method includes creating a volume in a first datacenter, the volume in the first datacenter accessible as a virtual volume exposed to the first datacenter and a second datacenter, and establishing replication of the virtual volume to a third datacenter.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIGS. 13A-13C are screen shots of respective graphical user interfaces for adding networks, storage ports, and storage pools according to example embodiments of the present invention;

DETAILED DESCRIPTION

Figure 1:
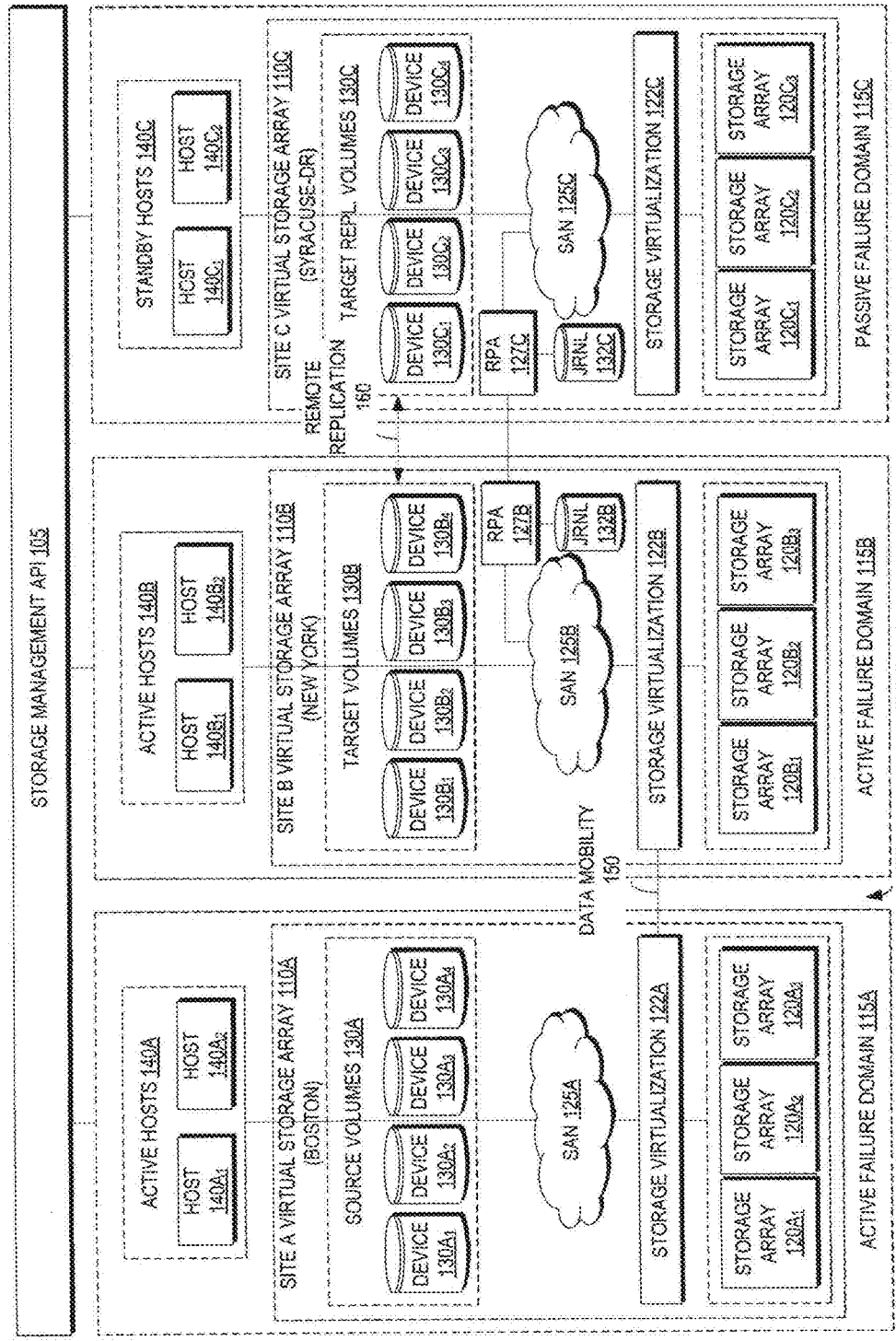
FIG. 1 is a block diagram of a system according to an example embodiment of the present invention including a first site in a first active failure domain and a second site in a second active failure domain providing a virtual volume having data mobility, and a third site in a passive failure domain providing remote replication of the virtual volume provided by the first site and the second site from the second site to the third site.

Conventionally, storage administrators choose the underlying storage arrays and storage pools manually. Typically, storage administrators use the storage pools to create the replicated underlying storage volumes. Generally, an administrator ensures connectivity between the a virtual service layer, such as VPLEX® by EMC Corporation of Hopkinton, Mass., back-end ports and the underlying storage arrays. Usually, an administrator configures a virtual service layer to create a virtual volume. Commonly, an administrator has to re-discover the LUNs presented by underlying Storage Arrays. Typically, the administrator claims the underlying storage volumes. Conventionally, an administrator may have had to create extents and local devices from the underlying volumes. Generally, an administrator may have had to create distributed device from the local devices. Usually, an administrator would have to create a virtual volume from the distributed devices.

In certain embodiments, the current disclosure may enable orchestration of End-to-End Storage Provisioning using a Storage Virtualization Appliance in conjunction with a SAN Network and underlying Storage Arrays to provide the physical storage to the virtual storage. In a particular embodiment, the enabled orchestration may provide Federated Storage for Converged Infrastructure Services consisting of compute, storage, and networking resources that may be used for virtual services by virtual machines such as that of VMWare Vsphere. In another embodiment, the orchestration may provide Federated Storage to the heterogeneous storage platforms that supports Storage and SAN Networking provisioning.

In most embodiments, when building out a service that will support applications running in multiple locations, one of the main challenges may be providing the same data to all those users (some of whom may be in a location that is a great distance away from others). In certain embodiments, as in a stretched cluster, a group of hosts that are clustered together may provide the computing power for a service, but some of the hosts may be in a geographically different location than others, allowing uninterrupted service should one location become unavailable.

In some embodiments, the current disclosure may enable seamless migration of data between devices, which may enable data of an application to be moved transparently to a user. In another embodiment the current disclosure may enable a Virtual Storage federation to achieve transparent mobility and access in a data center and between data centers. In further embodiments, the current disclosure may enable resiliency by mirroring data across arrays within a single data center or between data centers without host impact, which may increase availability for critical applications. In still further embodiments, the current disclosure may enable distributed cache coherency to automate sharing, balancing, and failover of I/O across the cluster and between clusters whenever possible. In other embodiments, the current disclosure may enable advanced data caching to improve I/O performance and reduce storage array contention.

Conventionally, allocation and provisioning of the federated storage required for such a cluster has typically been a complex process, requiring many steps and can be error prone. In certain embodiments, the current disclosure may automate the provisioning, configuration and presentation of the storage to the hosts, providing end-to-end provisioning in a single pane of glass. In most embodiments, enabling end-to-end provisioning in a single pane of glass may benefit end users and IT specialists.

Previously, in order to configure federated storage, an end-user who needed distributed storage for their application had to engage IT specialists from multiple silos within their organization, be authorized by multiple entities to acquire resources, and then wait for the resources to be made available. Typically, then multiple IT specialists had to configure multiple components, use disparate management tools, manually track parameters being configured (such as WWNs, etc.), all the while communicating needs within their own departments. Conventionally, performing regular configuration tasks in this manner was difficult, error prone, requires intimate knowledge of each component and has to be repeated whenever requirements expand.

In further embodiments, end-users may control the entire storage process from a single application, use pre-authorized resources from a pool, and configure the storage, network & access to hosts without need of using separate tools and acquiring multiple authorizations and knowing the details of each underlying domain. In certain embodiments, IT specialists may add resources to pools to make them available to end-users before the resources are needed, see what resources were claimed and how much is left, while enabling automated managing of pools of IDs (like WWNs, etc.).

In a particular embodiment, a user may start by specifying properties of a storage service that may contain storage that is to be distributed across locations or sites. In at least one embodiment, the user may use a GUI to specify the pre-determined grade of storage (e.g.: gold, silver, etc.) and the size of the volumes to be included. In some embodiments, once planned, the service may be provisioned, which may start a workflow engine that may communicate through a driver that issues commands to the underlying storage array where the physical storage exists. In certain embodiments, the workflow engine may enable the storage to be allocated based on the requested grade. In further embodiments, the workflow engine may enable networking tasks to be carried out to expose the volumes to the storage virtualization component (e.g.: EMC's VPLEX). In at least some embodiments, after provisioning and networking, a second storage array in the remote location may be similarly provisioned and networked. In further embodiments, staging commands may be issued to a storage virtualization layer where created storage volumes are claimed and packaged into a distributed volume.

In other embodiments, a user may be presented with the storage service they requested, containing the requested storage. In some embodiments, a user may attach this storage service to any other standard services in the system, allowing the services to access the same storage. In certain embodiments, if there is a stretched cluster, the hosts in one location may be part of one standard service, and may represent one half of the cluster, while another standard service may contain the hosts in the other half of the cluster. In some embodiments, standard services may be separated by geography.

In an embodiment, after attaching the services a workflow engine may start the process of provisioning the necessary networking components to make the distributed storage visible to the hosts in the standard services. In most embodiments, the engine may synchronize the storage into one cluster in the cloud management component (e.g.: VMWare's vSphere). In certain embodiments, a user may increase the storage or number of hosts in an elastic fashion without service interruption, and decommission it when no longer needed, returning the resources to be reused by other services.

In certain embodiments, storage allocation requests may be made by a User Interface to an API Layer. In some embodiments, an API Layer may support a createVolumes method that may create one or more storage volumes of a user specified size and with a user specified Class of Service (given by a CoS entry in the Database.) In at least some embodiments, an API Layer may support an exportGroupCreate method that may export one or more storage volumes to one or most host computer systems.

In certain embodiments, the Class of Service associated with provisioned storage may be set up by the System Administrator. In certain embodiments, Class of Storage (CoS) may specify attributes about the Storage Pool to be selected, such as the RAID Levels, Disk Drive Types, System Types, and Protection Type. In an embodiment, an API Layer may use a class of service to select a hardware Storage Array and a Storage Pool within an array to create storage volumes. In most embodiments, Class of Service entries may enable specific attributes to be enumerated that may define selection of pools with particular characteristics.

In certain embodiments, Class of Service may include High Availability type, which may be used to determine the location(s) of the storage array used for the storage. In an embodiment, high availability type of storage may be a local volume stored in one neighborhood, which may be a geographic location such as a data center. In other embodiments, high availability type of storage may be a distributed virtual volume stored in two neighborhoods. In further embodiments, other types of virtualization platforms (other than VPLEX) may support additional or alternate high availability types. In some embodiments, high availability may cause storage provisioning orchestration to choose redundant Storage Arrays in different geographical locations to hold replicated copies of the volume(s). In an embodiment, a Storage Pool that is compatible with the CoS entry may be selected on each Storage Array and used to make the physical storage volumes. In at least some embodiments, replicated physical storage volume(s) may be combined by the Virtualization Hardware (e.g. the VPLEX) to make a distributed virtual volume.

In a first embodiment, an orchestration layer may be enabled to orchestrate creation of an underlying Storage Volume on two different Hardware Storage Arrays for a volume requested to be created by a user. In this embodiment, the underlying volumes may be used to provide data redundancy for the storage volume in different geographical locations. In some embodiments, the underlying volumes may be created by the orchestration layer if needed. In another embodiment, the orchestration layer may be enabled to arrange for connectivity between the virtual service layer hardware, such as EMC's VPLEX, and underlying Storage Array hardware (such as EMC's VMAX or VNX). In some embodiments, the creation of the connectivity may be performed by creating one or more SAN zones. Virtual Service layer back-end ports may serve as initiators to array front-end ports. In further embodiments, by creating a Mapping/Masking View on the underlying Storage Arrays that associates initiators, storage ports, and logical units (volumes) that may be used by the initiators. In still further embodiments, the orchestration layer may be enabled to set up a virtual volume on a virtual service layer, such as EMC's VPLEX. In some embodiments, a virtual volume may be distributed so as to be accessible from two different geographical locations. In further embodiments, the virtual volume may be managed by the virtual service layer and may be stored in a replicated fashion on the underlying storage volumes. In most embodiments, the user may store user data in a virtual volume, which may cause a virtual service layer to replicate the user data and store it in the underlying storage array volumes.

In some embodiments, when a Virtual Volume has been created, it may be exported. In certain embodiments, the export may occur with an exportGroupCreate API call. In most embodiments, the exportGroupCreate API call may occur once on each neighborhood or network representing a geographical location. In at least some embodiments, the exportGroupCreate API call may create a SAN Zone that allows communication between the client Host(s) and virtual service layer front-end ports. In other embodiments, the exportGroupCreate API call may create virtual service layer Storage View structures that may export the volume(s). In certain embodiments, the exportGroupCreate API call may create Mapping/Masking views if required by the API request.

In certain embodiments, API calls may enable unexporting and deleting virtual volumes. In most embodiments, the orchestration API may enable tear down of the various components that were created from the top-down (in reverse order of creation) in a centralized automated way.

In certain embodiments, the current disclosure may enable distributed access to storage volumes in an active-active configuration with a virtual service layer configuration. In other embodiments, the current disclosure may enable migration of storage volumes from one geographical location to another geographical location transparently without down time. In further embodiments, the current disclosure may enable migration of storage volumes from one Storage Array to a different Storage Array transparently without down time. In certain embodiments, migration may be used to upgrade array hardware to a newer technology or to change the storage Class of Service to an array with different performance/cost trade-offs without having to limit access to the virtual volume.

In certain embodiments, a user may select an appropriate CoS or Storage Pool Grade for the creation of storage volumes. In other embodiments creation of volumes may be automated through an API call and an orchestration engine. In at least one embodiment, the CoS or Storage Pool Grade may be used for the creation of volumes through an API call using an orchestration engine. In some embodiments, unprotected/non virtualized volumes and protected/virtualized volumes may be created.

In certain embodiments, in response to a request for a virtual storage volume a determination may be made how many storage volumes are needed to satisfy the request. In some embodiments, the storage arrays available to use to create the volumes may be determined. In most embodiments, a determination may be made which storage pools are available for the virtual storage volumes. In some embodiments, Storage Arrays may be determined by analyzing the virtual service layer configuration to identify the associated arrays to identify the arrays associated with the virtual storage hardware layer. In an embodiment, a Storage Pool may be selected from a pull down list of available pools pre-populated by automated array discovery drivers.

In other embodiments, an end user may specify a primary neighborhood name (geographic location of the volume) and Class of Service entry (CoS) by name that may indicate a Virtual service layer and distributed Virtual Volume that may be used and what attributes must be present in the Storage Pools to be selected. In some of these other embodiments, an end user may optionally specify the secondary neighborhood name which could be used to identify the other geographic location for the distributed copy of the volume. In certain embodiments, an orchestration API may identify Storage Arrays that have suitable Storage Pools that can be protected by a virtual service layer in the secondary neighborhood. In further embodiments, a user does not specify a secondary neighborhood using the orchestration API, an appropriate secondary neighborhood may be chosen that may be used for virtual service layer protection and the requisite Storage Pools to satisfy the virtual volume request.

In some embodiments, the orchestration API may enable creating the (underlying) Storage Volumes on the Storage Arrays. In embodiments with a virtual service layer, creating storage volumes may occur twice. In most embodiments, creation of a storage volume may use information specified in the orchestration API. In certain embodiments, the orchestration API may have driver information for the storage arrays in the data storage environment.

In at least some embodiments, the orchestration API may be enabled to create connectivity between storage components, such as the virtual service layer, storage arrays, switches and hosts. In an embodiment, the orchestration API may create SAN Zones between the (underlying) Storage Arrays and Back End Ports of the virtual service layer. In most embodiments, creation of network connectivity may be performed for each geographical location (neighborhood) used in the virtual service layer distributed volume, and each time may require creating several Zones in the configuration (often one for each Back End Port of the virtual service layer to be used).

In most embodiments, the orchestration API may be able to select appropriate Storage Ports and Virtual service layer Ports to be used, and may create the appropriate connectivity or zones in each neighborhood. In further embodiments, connectivity or previously created zones may be used to support newly created volumes or virtual volumes.

In some embodiments, a Storage Array Export Group may be created. In most embodiments a storage array export group may contain identifiers for Host Initiators, Volumes, and Storage Ports to be used for exporting the volume from the Storage Array to a virtual service layer. In certain embodiments, creating a storage array export group may be repeated for each Storage Array used to construct the distributed volume. In further embodiments, if a storage array export group exists, the group may be reused for future virtual storage volumes if it satisfied the parameters in the orchestration API. In an embodiment, reuse of a group for future virtual volumes may require the addition of the underlying volumes (or LUNS) for the new virtual volume to be added. In some embodiments, an Orchestration API may determine if a satisfactory Storage Group exists, decides to create a new Storage Group or add the volume to an existing Storage Group, and may call the device driver to configure the Export Group. In some embodiments, creation of a storage array export group may involve sub-steps of creating an Export Mask or Masking View, creating Initiators or Host entries, etc. as determined by the device driver.

In most embodiments, Storage Volume(s) may be claimed by the virtual service layer. In certain embodiments, the virtual service layer may not be able to use the underlying storage until the storage has been created and exported to the virtual service layer. In some embodiments, an Orchestration API may cause the virtual service layer through a driver to perform a "rediscovery" operation on the virtual service layer to locate newly created volumes and to claim the volume.

In some embodiments, the orchestration API may cause the virtual storage layer to create extents representing the Storage Volume(s). In certain embodiments, creating the extents may create a mapping in the virtual service layer called an "Extent" that specifies what portion (or all) of a volume may be intended to be used. In most embodiments, an Orchestration API using a virtual service layer device driver may create extent(s) for each underlying volume.

In some embodiments, the orchestration API may create a local device on the virtual service layer that represents a virtual storage layer local "device." In most embodiments, creation of the local device at the virtual storage layer is performed by an Orchestration API using a virtual service layer device driver that creates the device(s) for each underlying volume.

In further embodiments, a distributed device may be created at the virtual service layer. In most embodiments, this step may be performed if a distributed virtual volume is being created. In some embodiments, an Orchestration API using a virtual service layer device driver may create a Distributed Device from the two local devices that were created.

In most embodiments, the orchestration API may create a virtual volume using the virtual service layer. In certain embodiments, a virtual volume may be considered distributed if the volume is created from a Distributed Device. In other embodiments, if a volume is not created from a distributed device, the volume may be a local volume. In some embodiments, the orchestration API may use a virtual service layer driver to create a Virtual Volume from a Distributed Device or a local Device.

In certain embodiments, the orchestration API may determine the WWN (World Wide Name) addresses for each of the Host Initiators (Host SAN Ports). In some embodiments, the orchestration API may provision the Initiators in a UCS Blade with a value selected from a pre-defined Storage Pool. In at least one embodiment, the orchestration API may store the WWN values in an internal database. In other embodiments, the orchestration API may automatically discover WWNs using an external management agent. In some of these embodiments, the orchestration API may select initiators from an internal database. In still further embodiments, a user may provide the orchestration API with WWN information.

In further embodiments, the orchestration API may select front end ports on the virtual service layer which may be used to access the volume. In most embodiments, an Orchestration API may examine the inventory of front-end ports in a database and may select the appropriate port(s) based on a set of criteria. In an embodiment, the number of ports to be selected may be taken from a value in the Class of Service (CoS) entry used to create the volume. In another embodiment, ports may be selected if the port has visibility to the SAN fabric or VSAN containing the initiator(s). In other embodiments, if multiple ports are to be selected the selection may be based on maximizing the redundancy (i.e. choosing ports on different virtual service layer locations or directors). In still further embodiments, port affinity may be used to reuse the same ports for the same Storage Service. In still other embodiments, database entries for the virtual service layer front-end ports may contain a WWN. In further embodiments, the database entries for the virtual service layer may contain WWN values, the port value WWPN that identifies a particular port, and a node value WWNN that identifies a "node," which may contain multiple ports.

In most embodiments, the orchestration API may create SAN Zones to enable Initiators to access the Storage Ports. In certain embodiments, a Orchestration API may determine the pairs of Initiator WWNs to virtual service layer front-end port WWNs that may need to be paired together into SAN Zones. In further embodiments, the orchestration API may create the Zones automatically using a Network device driver if the zone is not already present.

In some embodiments, the Initiators of a host may be registered with the virtual service layer by the orchestration API. In most embodiments, for the Initiators to be used by a virtual service layer, the initiators may need to be "registered." In certain embodiments, this may mean that the initiator may need to be visible to the network, i.e. have established connectivity to the SAN switches which may control the network. In further embodiments, an Orchestration API may invoke a virtual service layer device driver to register an Initiator.

In most embodiments, it may be necessary to create a storage view. In certain embodiments, a new volume may be added to an existing Storage View. In other embodiments a new storage view may need to be created for a new volume. In at least some embodiments, an Orchestration API may invoke a virtual service layer device driver to create a new Storage View. In certain embodiments, the orchestration API may add selected Storage Ports and Initiators to the storage view.

In some embodiments, the orchestration API may add a volume to be exported to the virtual storage layer Storage View. In most embodiments, an orchestration API may invoke a virtual service layer device driver to add the volume to the virtual storage layer Storage View.

In certain embodiments, the current disclosure may be enabled to migrate volumes and the associated data from one storage array or device to another storage array or device. In certain embodiments, it may be necessary to determine the number of new storage volumes required to migrate a virtual volume. In other embodiments, it may be necessary to determine the storage arrays on which the storage volumes may be created. In further embodiments, it may be necessary to determine from which storage pools the storage volumes are to be allocated.

In most embodiments, a client may specify a virtual volume to be migrated. In certain embodiments, for a local virtual volume, a client may specify the Class of Service (CoS) required for the new storage volume to which the data on the local virtual volume will be migrated. In other embodiments, for a distributed virtual volume, which may utilize backend storage volumes in multiple neighborhoods corresponding to the geographic location of the virtual service layer clusters, a CoS may be specified for a neighborhood or region of connectivity. In some embodiments, using the class of service and determined information, an orchestration API may identify storage arrays with suitable storage pools that satisfy the specified CoS and have available free capacity to create the storage volume(s) to which the data of the specified virtual volume may be migrated.

In most embodiments, an orchestration API may create the storage volume(s) on the backend storage array(s). In certain embodiments for a virtual volume, an orchestration API may create two volumes. In some embodiments, creation of storage array may be done using a device driver for the storage mediums or storage arrays on which the volume is created.

In at least some embodiments, an orchestration API may create connectivity by creating SAN zones between the backend storage arrays and the virtual service layer back end ports. In certain embodiments, the orchestration API may make one set of connectivity for a local virtual volume. In other embodiments, an orchestration API may create two or more types of connectivity for a distributed virtual volume. In at least some embodiments, the orchestration API may select frontend ports of a storage array and backend ports of a virtual storage layer used for the virtual volume. In most embodiments, the orchestration API may create the appropriate zone(s) or connectivity in each neighborhood. In other embodiments, the orchestration API may reuse existing zones to support communication for new volumes.

In certain embodiments, an orchestration API may configure a storage array storage group containing backend virtual service layer ports (initiators), storage volumes, and frontend storage array ports (targets). In certain embodiments, the configuration may be performed once for a local virtual volume. In other embodiments, the configuration may be performed two or more times for a virtual volume. In still further embodiments, a storage volume may be added to an existing storage group. In most embodiments, an Orchestration engine may call a device driver to configure a storage group. In some embodiments, configuration may involve sub-steps of creating an export mask or masking view, creating initiators or host entries as determined by the device driver.

In some embodiments, the Orchestration API may enable a storage volume to be claimed by a virtual storage layer. In most embodiments, for a storage volume to be claimed by a virtual storage layer, the virtual storage layer may need to be able to see the storage volume. In most embodiments, an Orchestration layer may use a virtual service layer device driver to perform a "rediscovery" operation on the virtual service layer to locate the storage a newly created storage volume. In other embodiments, if a virtual service layer has discovered a storage volume, the virtual storage layer may claim the volume.

In at least some embodiments, virtual volume extents may be created for the virtual volumes to determine what portion of the virtual volume may be used. In certain embodiments, an Orchestration API may use a virtual service layer to create the extent(s) for a storage volume claimed by a virtual service layer.

A discussion of some types of virtual storage may be found in U.S. Pat. No. 7,206,863 entitled "SYSTEM AND METHOD FOR MANAGING STORAGE NETWORKS AND PROVIDING VIRTUALIZATION OF RESOURCES IN SUCH A NETWORK" issued on Apr. 17, 2007, U.S. Pat. No. 7,216,264 entitled "SYSTEM AND METHOD FOR MANAGING STORAGE NETWORKS AND FOR HANDLING ERRORS IN SUCH A NETWORK" issued on May 8, 2007, U.S. Pat. No. 7,225,317 entitled "SYSTEM AND METHOD FOR MANAGING STORAGE NETWORKS AND FOR MANAGING SCALABILITY OF VOLUMES IN SUCH A NETWORK" issued on May 29, 2007, U.S. Pat. No. 7,315,914 entitled "SYSTEMS AND METHODS FOR MANAGING VIRTUALIZED LOGICAL UNITS USING VENDOR SPECIFIC STORAGE ARRAY COMMANDS" issued on Jan. 1, 2008, U.S. Pat. No. 7,739,448 entitled "SYSTEM AND METHOD FOR MANAGING STORAGE NETWORKS AND PROVIDING VIRTUALIZATION OF RESOURCES IN SUCH A NETWORK" issued on Jun. 15, 2010, U.S. Pat. No. 7,620,774 entitled "SYSTEM AND METHOD FOR MANAGING STORAGE NETWORKS AND PROVIDING VIRTUALIZATION OF RESOURCES IN SUCH A NETWORK USING ONE OR MORE CONTROL PATH CONTROLLERS WITH AN EMBEDDED ASIC ON EACH CONTROLLER" issued on Nov. 17, 2009, U.S. Pat. No. 7,620,775 entitled "SYSTEM AND METHOD FOR MANAGING STORAGE NETWORKS AND PROVIDING VIRTUALIZATION OF RESOURCES IN SUCH A NETWORK USING ONE OR MORE ASICS" issued on Nov. 17, 2009, and U.S. Pat. No. 7,770,059 entitled "FAILURE PROTECTION IN AN ENVIRONMENT INCLUDING VIRTUALIZATION OF NETWORKED STORAGE RESOURCES" issued on Aug. 3, 2010, all to EMC Corporation of Hopkinton, Mass. and all of which are hereby incorporated by reference in their entirety.

Typically, storage (or data) protection is provided by any of a series of technologies that makes a copy of an original set of data to target devices. Generally, the copy of the data may be used if an event such as data failure occurs such as, for example, when the original copy of data is destroyed, corrupted, or otherwise unavailable. Conventionally, different strategies may be used to provide data protection for different types of failures that can occur. Usually, some strategies are continuous (source and targets are kept in sync), while others are simply refreshed periodically.

Current solutions to deploy such data protection strategies are predominantly documented procedures that must be executed by an IT professional each time a request for new storage is submitted. Similarly, typical clean-up of such resources is also a documented procedure, but is conventionally neglected until storage or protection resources become scarce. Usually, partially automated solutions to parts of the strategy are sometimes written in the form of executable scripts that are built in-house or by a service professional that is tailor-made to the specific infrastructure and needs of the datacenter. Generally, the solutions are difficult to maintain and inflexible to the constantly-changing datacenter.

In certain embodiments, the current disclosure may enable creation of an ecosystem of centralized global datacenter management, regardless of the storage manufacturer, protocol, and geographic disparity. In some embodiments, an IT professional may be enabled to configure a datacenter to leverage a unified management platform to perform various tasks via one interface, such as a web portal, without having to use different element managers or CLIs. In certain embodiments, an API may be enabled that can automatically create a protected storage volume on a source site replicated on a target volume on a target site.

In example embodiments of the present invention, the following definitions may be beneficial:
  Storage Volume: A Logical Unit (LU) or unit of storage presented by the back end array;
  Extent: A portion of a disk (with VPLEX, you can create an extent that uses the entire capacity of the underlying storage volume, or just a portion of the volume);
  Device: A combination of one or more extents to which you add specific RAID properties (Local devices use storage from only one cluster. In VPLEX Metro and Geo configurations, distributed devices use storage from both clusters);
  Top Level Device: Consists of one or more "child" devices.
  Virtual Volume: A virtual volume is created on a device or a distributed device, and is presented to a host through a storage view.

FIG. 1 is a block diagram of a system 100 according to an example embodiment of the present invention including a first site (e.g., Site A—Boston) in a first active failure domain 115A and a second site (e.g., Site B—New York) in a second active failure domain 115B providing a virtual volume (not shown) having data mobility 150, and a third site (e.g., Site C—Syracuse-DR) in a passive failure domain 115C providing remote replication 160 of the virtual volume provided by the first site 115A and the second site 115B from the second site 115B to the third site 115C.

In accordance with an embodiment of the present invention, each side (i.e., active failure domains 115A, 115B and passive failure domain 115C) of the system 100 includes four major components coupled via a respective Storage Area Network (SAN) 125A, 125B, 125C; namely, (i) a storage system, (ii) a host computer, (iii) a storage virtualization device, and (iv) a replication appliance (RPA). Specifically with reference to FIG. 1, the first active failure domain SAN 125A includes a plurality of active host computers 140A (e.g., host $140A_1$ and host $140A_2$), a source storage system which may comprise a plurality of storage arrays $120A_1$, $120A_2$, $120A_3$ (120A generally), and a storage virtualization device 122A. Additionally, the second active failure domain SAN 125B includes a plurality of active host computers 140B (e.g., host $140B_1$ and host $140B_2$), a source storage system which may comprise a plurality of storage arrays $120B_1$, $120B_2$, $120B_3$ (120B generally), a storage virtualization device 122B, and a replication appliance (RPA) 127B. Similarly, the passive failure domain SAN 125C includes a plurality of standby host computers 140C (e.g., host $140C_1$ and host $140C_2$), a target storage system which may comprise a plurality of storage arrays $120C_1$, $120C_2$, $120C_3$ (120C generally), a storage virtualization device 122C, and a replication appliance (RPA) 127C. It should be understood that, in the case of VPLEX, and in a preferred embodiment, the journal volumes 127B, 127C are not highly available volumes according to RecoverPoint best practices.

Generally, a SAN includes one or more devices, referred to as "nodes" (not shown). A node in a SAN may be an "initiator" or a "target", or both. An initiator node is a device that is able to initiate requests to one or more other devices; and a target node is a device that is able to reply to requests, such as Small Computer System Interface (SCSI) commands, sent by an initiator node. A SAN may also include network switches (not shown), such as fiber channel switches. The communication links between each host computer and its corresponding storage system may be any appropriate medium suitable for data transfer, such as fiber communication channel links. In an embodiment of the present invention, the host communicates with its corresponding storage system using SCSI commands.

The system 100 includes source storage system 120A, target storage system 120B, and replication target storage system 120C (120 generally). Each storage system 120 includes physical storage units for storing data, such as disks or arrays of disks. Typically, storage systems 120 are target nodes. In order to enable initiators to send requests to a storage system 120, the storage system 120 exposes one or more logical units (LUs) to which commands are issued. A logical unit is a logical entity provided by a storage system 120 for accessing data stored in the storage system 120. A logical unit is identified by a unique logical unit number (LUN). In an embodiment of the present invention, the first active failure domain storage system 120A exposes a plurality of source logical units (not shown), the second active failure domain storage system 120B exposes a plurality of target logical units (not shown), and the passive failure domain storage system 120C exposes a plurality of replication target logical units (not shown). Thus, the storage systems 120 are SAN entities that provide multiple LUs for access by multiple SAN initiators. In an embodiment of the present invention, the passive failure domain LUs are used for replicating the active failure domain LUs. As such, each passive failure domain LU is generated as a copy of its respective active failure domain LU.

The system 100 includes active failure domain host computer 140A, 140B and a passive failure domain host computer 140C (140 generally). A host computer 140 may be one computer, or a plurality of computers, or a network of distributed computers. Each computer may include inter alia a conventional CPU, volatile and non-volatile memory, a data bus, an I/O interface, a display interface and a network interface. Generally a host computer 140 runs at least one data processing application, such as a database application or an e-mail server.

Generally, an operating system of a host computer 140 creates a host device 130 for each logical unit exposed by a storage system in the host computer SAN 125A, 125B, 125C. A host device 130 is a logical entity in a host computer 140, through which a host computer 140 may access a logical unit. In an embodiment of the present invention, as illustrated in FIG. 1, the first active failure domain host 140A identifies LUs exposed by the first active failure domain storage system 120A and generates respective source devices $130A_1$, $130A_2$, $130A_3$, $130A_3$ (130A generally) through which it can access the active failure domain LUs. Similarly, the second active failure domain host 140B identifies LUs exposed by the first active failure domain storage system 120B and generates respective source devices $130B_1$, $130B_2$, $130B_3$, $130B_3$ (130B generally) through which it can access the active failure domain LUs. Moreover, the passive failure domain host 140C identifies LUs exposed by the passive failure domain storage system 120C and generates respective source devices $130C_1$, $130C_2$, $130C_3$, $130C_4$ (130B generally) (130 generally) through which it can access the passive failure domain LUs.

In an embodiment of the present invention, in the course of continuous operation, the host computer 140 is a SAN initiator that issues I/O requests (e.g., write/read operations) through host device 130 to its respective LU using, for example, SCSI commands. Such requests are generally transmitted to the LU with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

As illustrated in FIG. 1, the first virtual storage array 110A may be for Site A (e.g., Boston data center), the second virtual storage array 110B may be for Site B (e.g., New York data center), and the third virtual storage array 110C may be for Site C (e.g., Syracuse data center). The storage management API 105 may be configured to be aware of each of sites A, B, and C and that sites B and C are configured for remote replication. Accordingly, as will be described in greater detail below, example embodiments of the present invention leverage remote replication configurations between Site B and Site C to automatically protect devices 130 to remote data center by automating volume creation, zoning/masking, and initiating/monitoring remote replication.

Traditionally, establishing virtualized and/or distributed/clustered storage, and remote replication, was done via manual procedures using several different products, APIs, and GUIs with heavily documented procedures that must be executed by IT professionals. Even with proper planning and procedures, frequently, IT administrators find themselves with configuration issues, especially in cases of setting up multi sites, especially considering constantly changing data center environments. However, example embodiments of the present invention enable long distance (i.e., remote replication 160) protection of virtualized and/or distributed/clustered (e.g. VPLEX) storage. A storage management API 105 orchestrates the operations necessary to create and manage data protection of distributed/virtual volumes in a datacenter in order to meet a customer's service level objectives of protection.

The storage management API 105 processes several operations efficiently on a series of managed resources (e.g., storage arrays, network switches, replication appliances) to achieve protection of the storage in an automated fashion. Specifically, example embodiments of the present invention orchestrate the process to provision virtualized and/or distributed/clustered storage (e.g., VPLEX) volumes and protect such volumes with a remote replication technology (e.g., EMC RecoverPoint® by EMC Corporation of Hopkinton, Mass.). This automation seamlessly handles configurations within a single data center or spread across many data centers.

The storage management API 105 has visibility into underlying storage (e.g., VPLEX) and protection (e.g., RecoverPoint) mechanisms and their interconnectivity and applies internal algorithms to ensure requested storage is selected in a way that ensures protection. Each interconnection and their relationship in the orchestration process will be identified when this patent is pursued.

As illustrated in FIG. 1, a three site topology (i.e., Site A—Boston; Site B—New York; Site C—Syracuse-DR) with, for example, EMC RecoverPoint and VPLEX Local and Metro, allows IT administrators to avoid downtime associated with primary site loss and/or storage array failures, while being able to rapidly recover from application data corruption, viruses, and human error. In certain embodiments, VPLEX Metro customers are able to save unlimited points in time on a VPLEX Metro distributed/local virtual volume using RecoverPoint local and/or remote replication. Recovery from operational disasters such as application data corruption, viruses, and human error, can be achieved at one VPLEX Metro site (e.g., Site B—New York, where RecoverPoint appliances (RPAs) are deployed) or at a third (remote) site (e.g., Site C—Syracuse-DR).

As illustrated in FIG. 1, RPAs 127B, 127C are deployed at one VPLEX Metro cluster (e.g., Site B) and at a remote site (e.g., Site C). In some embodiments, Site C may be another independent VPLEX cluster, an array-based splitter supported by RecoverPoint, or a combination of the two. As will be described in greater detail below, the storage management API 105 may orchestrate creation of a volume exposed to both Site A—Boston and Site B—New York using, for example, VPLEX Metro and also have remote replication using, for example, RecoverPoint from Site B—New York to Site C—Syracuse-DR. As is understood in the art, RecoverPoint uses a journaling process (i.e., using journal (JRNL) volumes 132B, 132C) to replicate I/O from one site to the other.

Figure 2:
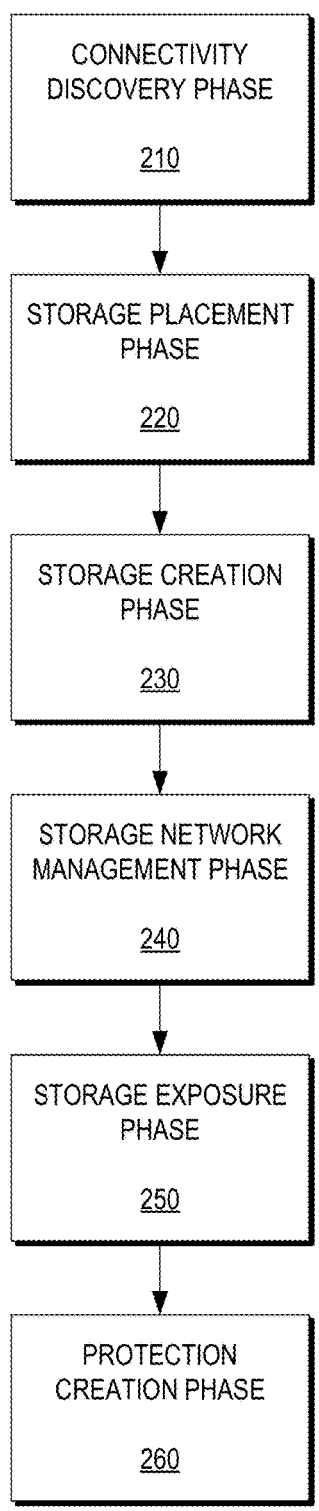
FIG. 2 is a flow diagram of a method according to an example embodiment of the present invention.
Figure 3:
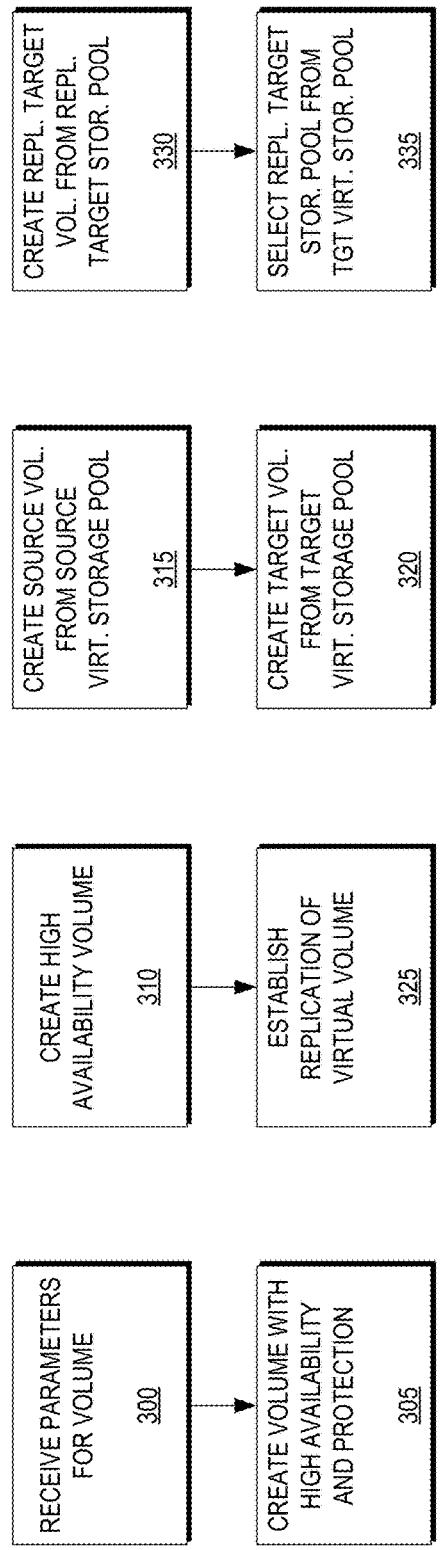
FIGS. 3A-3D are flow diagrams of methods for establishing replication of a virtual volume provided by the first site and the second site from the second site to the third site according to an example embodiment of the present invention.

FIGS. 2 and 3A-3D are flow diagrams of respective methods for creating a volume with data protection according to example embodiments of the present invention. As will be described in greater detail below, and as illustrated in FIG. 3A, the storage management API (e.g., storage management API 105 of FIG. 1) may receive parameters for a source volume (e.g., storage size, storage protocol, source location, and target location) as inputs (300). Example embodiments of the present invention then may create the volume with high availability and data protection according to the received parameters (305).

As illustrated in FIG. 2, the storage management API then may perform a series of orchestration steps to create a replicated volume. Connectivity discovery phase (210) discovers the connectivity of storage virtualization clusters (e.g., VPLEX) and data protection appliances in a data storage environment and backing storage array connectivity to storage virtualization clusters. Storage placement phase (220) finds storage virtualization clusters that match the API request and connectivity from source to targets. Storage creation phase (230) creates volumes on the source and target backing storage arrays and storage virtualization clusters in response to the parameters of the API request. Specifically, in a preferred embodiment, the storage creation phase creates backing storage volumes, zones front-end of backing storage array to back-end of the storage virtualization clusters (e.g., VPLEX), masks the backing storage array to the storage virtualization clusters, discovers volumes on the storage virtualization clusters and creates a virtual volume, and create consistency groups on the storage virtualization clusters (e.g., according to RecoverPoint and VPLEX best practices).

Storage network management phase (240) performs zoning operations between storage virtualization clusters to protect data protection appliances. Storage exposure phase (250) masks storage devices to data protection appliances. Protection creation phase (260) creates a protection relationship between volumes by adding the volumes to a replication group. Note however, in certain embodiments, certain orchestration steps may be omitted as specified by API 305. Remote replication (e.g., synchronous or asynchronous) then may be initiated according to a policy.

As illustrated in FIG. 3B, to create a volume with high availability and data protection, the storage management API 105 first creates a high availability virtual volume in a first datacenter (310). It should be understood that the volume in the first datacenter is accessible as a virtual volume exposed to both the first datacenter (e.g., Site A—Boston) and a second datacenter (e.g., Site B—New York). The storage management API 105 then may establish replication of the virtual volume exposed to Site A and Site B to a third datacenter (e.g., Site C—Syracuse-DR) (325).

As illustrated in FIG. 3C, in a preferred embodiment, and as will be described in greater detail below, the source volume created at Site A—Boston for the first VPLEX "leg" may be created from a source virtual storage pool in the first data center (i.e., at Site A—Boston) defining storage attributes for volumes created from the source virtual storage pool (315). Similarly, in a preferred embodiment, and as will be described in greater detail below, the target volume created at Site B—New York for the second VPLEX "leg" may be created from a target virtual storage pool in the second data center (i.e., at Site B—New York) defining storage attributes for volumes created from the target virtual storage pool (320). Likewise, as illustrated in FIG. 3D, in a preferred embodiment, and as will be described in greater detail below, the target volume created at Site C—Syracuse-DR for the remote replica may be created from a replication target virtual storage pool in the third data center (i.e., at Site C—Syracuse-DR) defining storage attributes for volumes created from the replication target virtual storage pool (330). The storage management API 105 then may associate the replication target volume with target volume (335).

Figure 4:
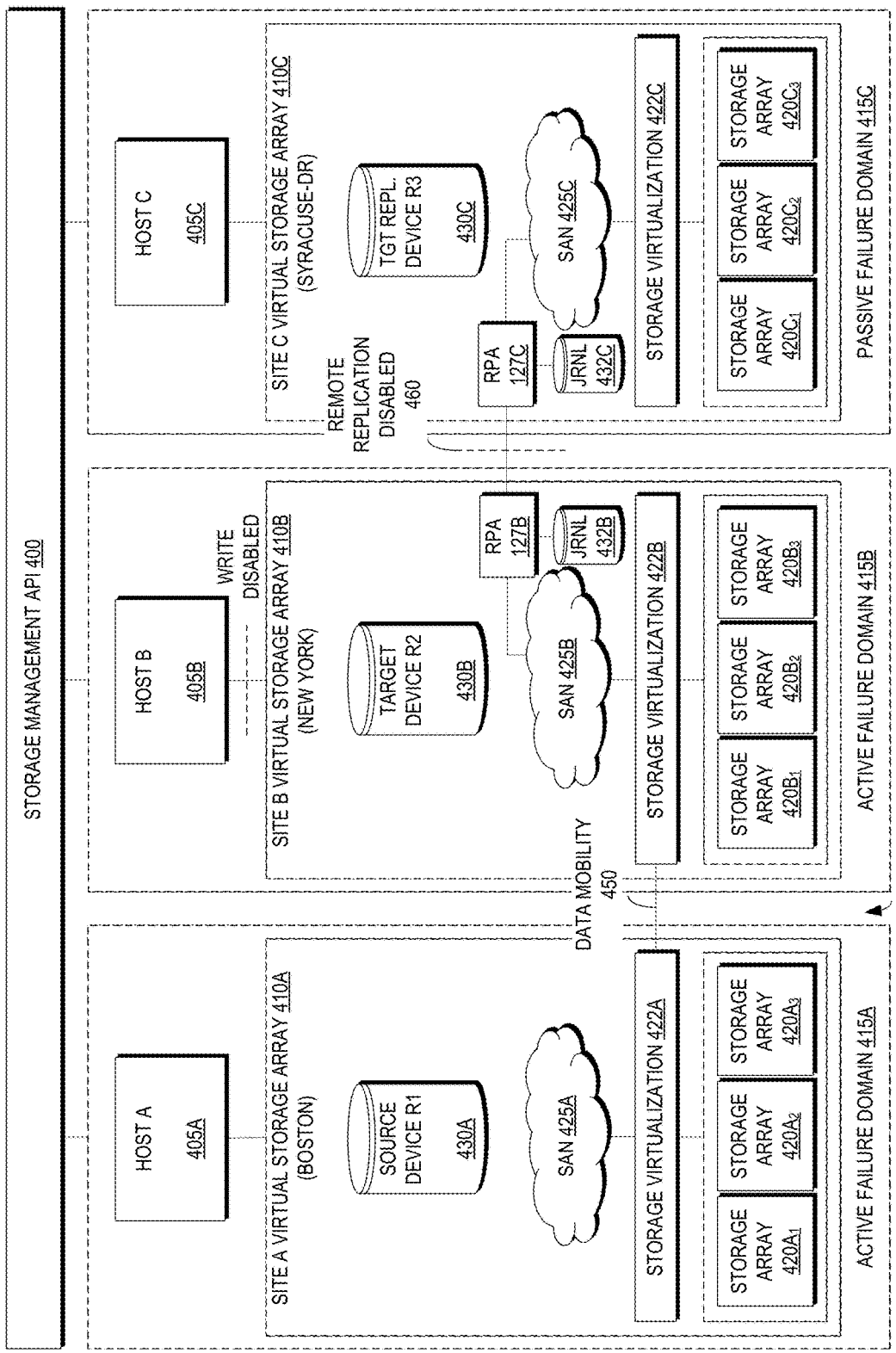
FIG. 4 is a block diagram of the system of FIG. 1 according to an example embodiment of the present invention in a first failover state with writes from a host in the second active failure domain disabled and remote replication to the third site of the virtual volume provided by the first site and the second site disabled.
Figure 8:
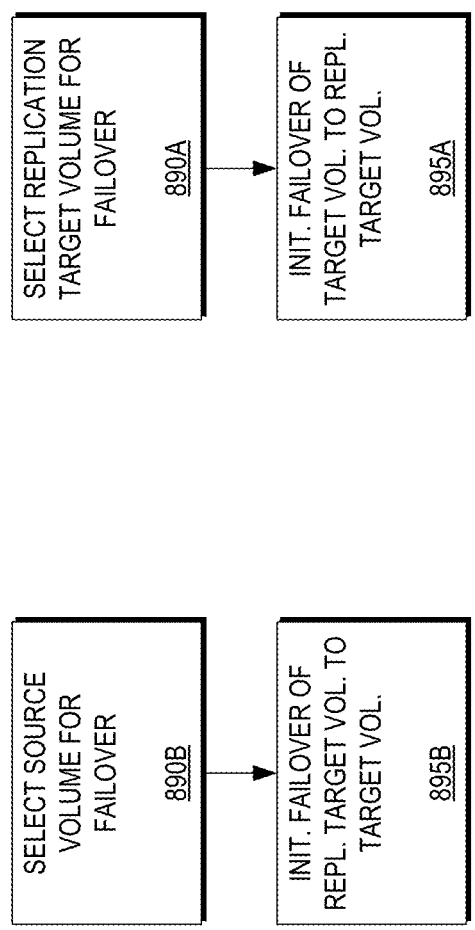
FIGS. 8A and 8B are flow diagrams of method of performing failover between a source volume, a target volume, and a target replication volume according to respective example embodiments of the present invention.

FIG. 4 is a block diagram of the system 400 of FIG. 1 according to an example embodiment of the present invention in a first failover state with writes from a host 405B in the second active failure domain 415B disabled and remote replication to the third site 415C of the virtual volume provided by the first site 415A and the second site 415B disabled. As illustrated in FIG. 8A, in case of a primary site (i.e., VPLEX site with RecoverPoint appliances) failure (e.g., second active domain 415B), VPLEX Metro customers can choose to continue operations at the secondary VPLEX site (e.g., first active domain 415A) while the primary site is repaired. Therefore, the user may select the source device R1 430A for failover (890A) and initiate failover of the target device R2 430B to the source device R1 430A to cause the source device R1 430A to operate as an active device (895A). However, the passive failure domain 415C will not be able to track I/Os because remote replication from the second active failure domain 415B to the passive failure domain 415C is disabled (with the primary site (i.e., second active failure domain 415B) in a first failover state) and will not resume until the primary site 415B is restored.

Figure 5:
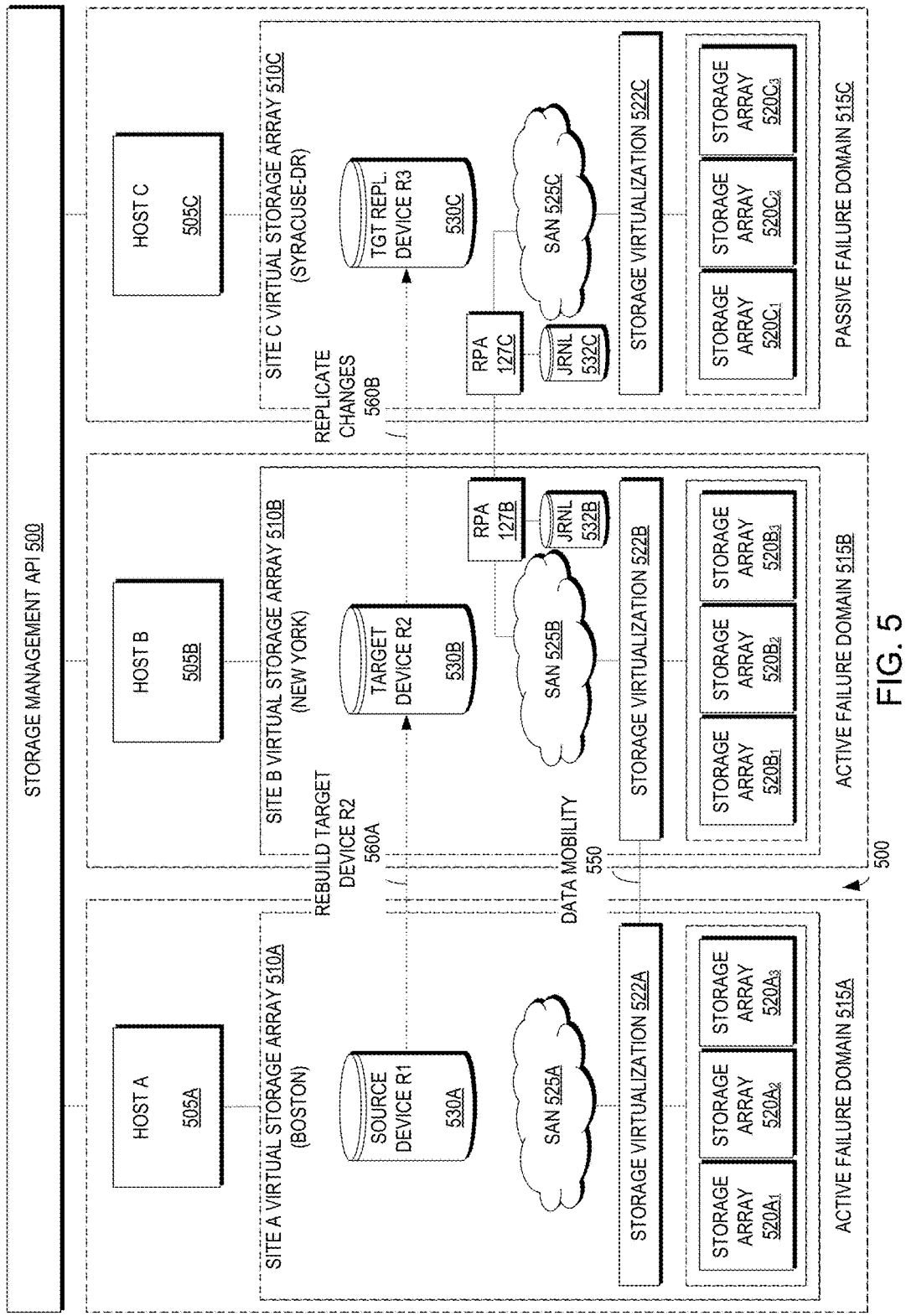
FIG. 5 is a block diagram of the system of FIG. 4 according to an example embodiment of the present invention in a second failover state with writes from the host in the second active failure domain restored and remote replication to the third site of the virtual volume provided by the first site and the second site restored to rebuild the target device in the second active failure domain from the source device in the first active failure domain and replicate changes from the target device in the second active failure domain to the target replication device in the passive failure domain.

FIG. 5 is a block diagram of the system 500 of FIG. 4 according to an example embodiment of the present invention in a second failover state with writes from the host 505B in the second active failure domain 515B restored and remote replication to the third site 515C of the virtual volume provided by the first site 515A and the second site 515B restored to rebuild the target device R2 530B in the second active failure domain 515B from the source device R1 530A in the first active failure domain 515A and replicate changes from the target device R2 530B in the second active failure domain 515B to the target replication device R3 530C in the passive failure domain 515C. Once the primary site 515B is restored, VPLEX will incrementally and non-disruptively rebuild 560A the copy of data located at the primary site 515B. This makes failing back to the primary site 515B a non-disruptive activity. Remote replication will also resume and the target replication device R3 530C will automatically re-synchronize by replicating 560B only the unique new data across from the remote site 515A.

Figure 6:
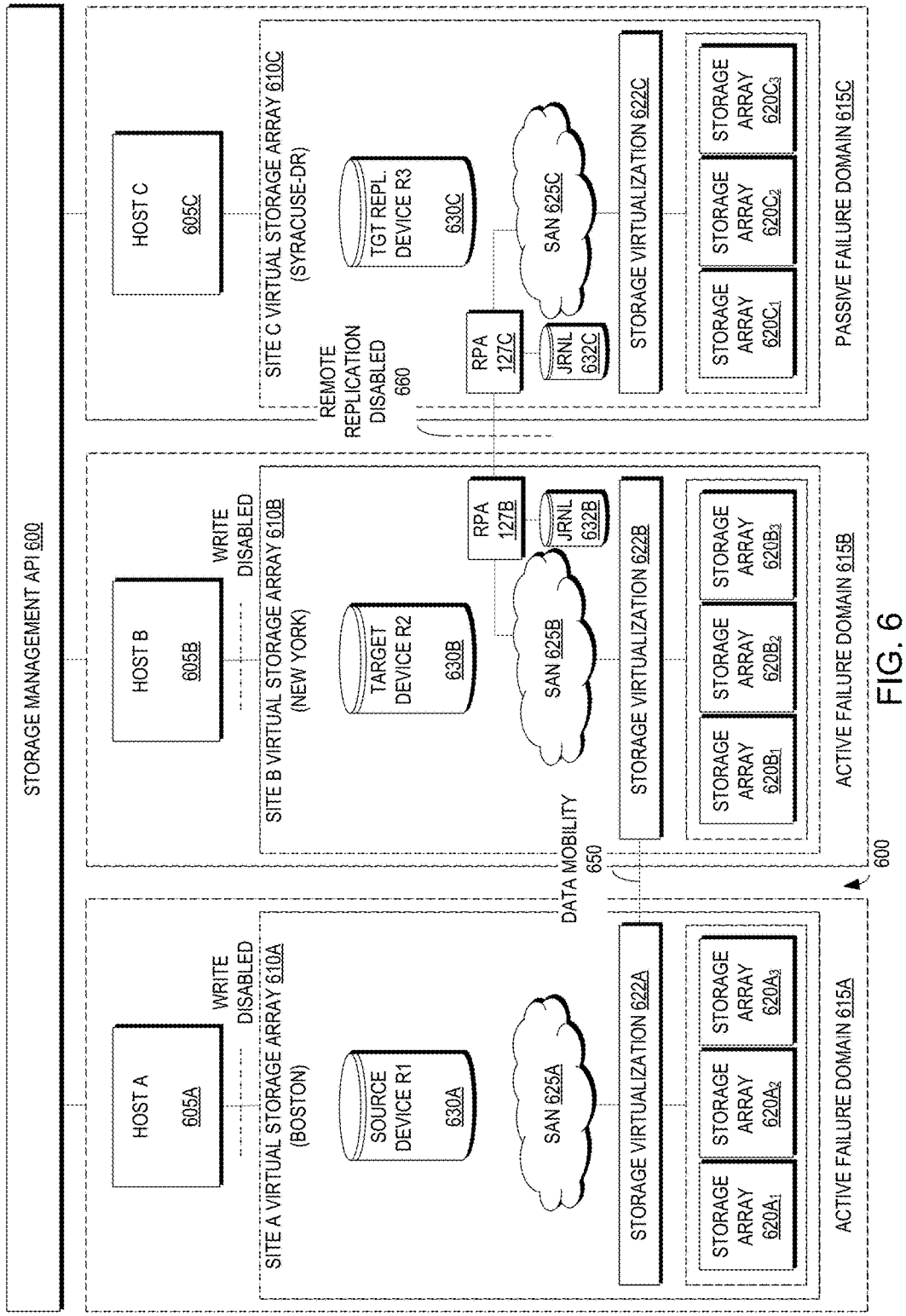
FIG. 6 is a block diagram of the system of FIG. 1 according to an example embodiment of the present invention in a first failover state with writes from hosts in both the first active failure domain and the second active failure domain disabled and remote replication to the third site of the virtual volume provided by the first site and the second site disabled.

FIG. 6 is a block diagram of the system 600 of FIG. 1 according to an example embodiment of the present invention in a first failover state with writes from hosts 605A, 605B in both the first active failure domain 615A and the second active failure domain 615B disabled and remote replication to the third site 615C of the virtual volume provided by the first site 615A and the second site 615B disabled. As illustrated in FIG. 8A, and in case of the loss of multiple VPLEX sites (e.g., Site A—Boston, Site B—New York) or logical corruption of a virtual volume, recovery at the remote site (e.g., Site C—Syracuse-DR) RecoverPoint customers can choose to continue operations at the remote replication site (e.g., passive failure domain 615C) while the primary 615A and secondary 615B sites are repaired. Therefore, the user may select the replication target device R3 630C for failover (890B) and initiate failover of the target device R2 630B to the replication target device R3 630C to cause the target replication device R3 630C to operate as an active device (895B). However, the second active failure domain 615B will not be able to track I/Os because remote replication from the passive failure domain 615C to the second active failure domain 615B is disabled (with the primary site (i.e., second active failure domain 615B) in a first failover state) and will not resume until the primary site 615B is restored.

Figure 7:
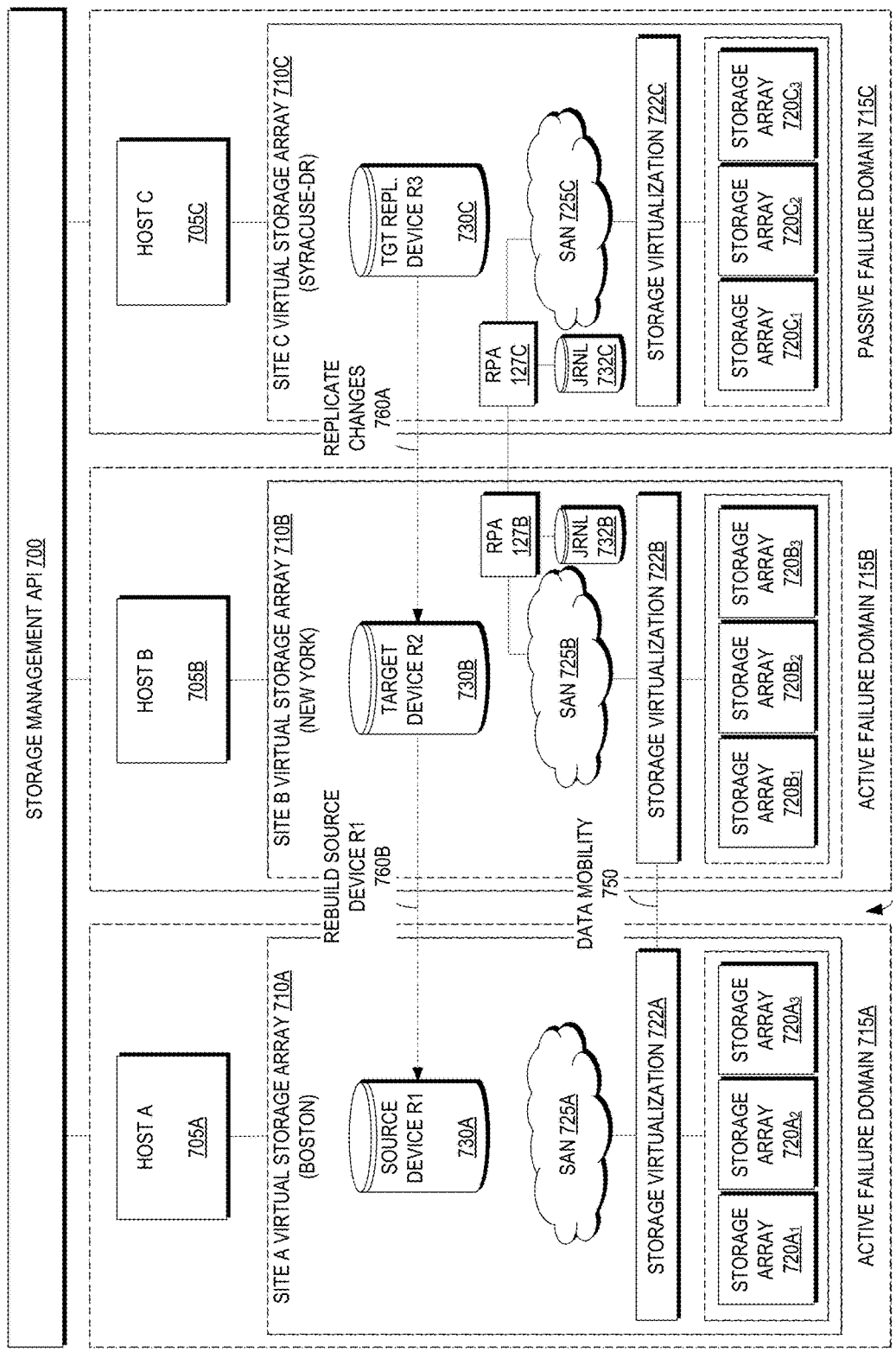
FIG. 7 is a block diagram of the system of FIG. 6 according to an example embodiment of the present invention in a second failover state with writes from the hosts in the first active failure domain and the second active failure domain restored and remote replication to the third site of the virtual volume provided by the first site and the second site restored to replicate changes from the target replication device in the passive failure domain to the target device in the second active failure domain and to rebuild the source device in the first active failure domain from the target device in the second active failure domain.

FIG. 7 is a block diagram of the system 700 of FIG. 6 according to an example embodiment of the present invention in a second failover state with writes from the hosts 705A, 705B in the first active failure domain 715A and the second active failure domain 715B restored and remote replication to the third site 715C of the virtual volume provided by the first site 715A and the second site 715B restored to replicate changes from the target replication device R3 730C in the passive failure domain 715C to the target device R2 730B in the second active failure domain 715B and to rebuild the source device R1 730A in the first active failure domain 715A from the target device R2 730B in the second active failure domain 715B. Once the primary and secondary sites 715A, 715B are restored, remote replication will resume and the target device R2 730B will automatically re-synchronize by replicating only the unique new data across from the target replication device R3 730C. VPLEX will also incrementally and non-disruptively rebuild the copy of data located at the secondary site 515A in the source device R1 730A. This makes failing back to the primary site 715B a non-disruptive activity.

Figure 9:
FIG. 9 is a screen shot of a graphical user interface illustrating a plurality of storage systems according to an example embodiment of the present invention.

FIG. 9 is a screen shot of a graphical user interface (GUI) 900 illustrating a plurality of storage systems according to an example embodiment of the present invention. As illustrated in FIG. 9, there are five storage systems 915A-915E (915 generally) available: three backing arrays (e.g., SYMMETRIX+000195701351 915A, SYMMETRIX+000195701505 915B, and SYMMETRIX+000198700406 915C) and two sets of VPLEX Metro configurations (e.g., VPLEX+FNM00114300288:FNM00114600001 915D and VPLEX+FNM00130900344:FNM00131100242 915E. The first is HA configuration we're going to use. The other we're just going to use one leg local for VPLEX targets.

As illustrated in FIG. 9, the GUI 900 may provide information regarding the storage systems 915, such as storage system name 910, the host 920 by which storage from the storage system is accessible, the storage system type 930 (e.g., VMAX, VPLEX), the storage system status 940 (e.g., available, failure), whether the storage system is registered 950 with the storage management API, and the ability to edit 960 the pools and ports comprising the storage system.

Figure 10:
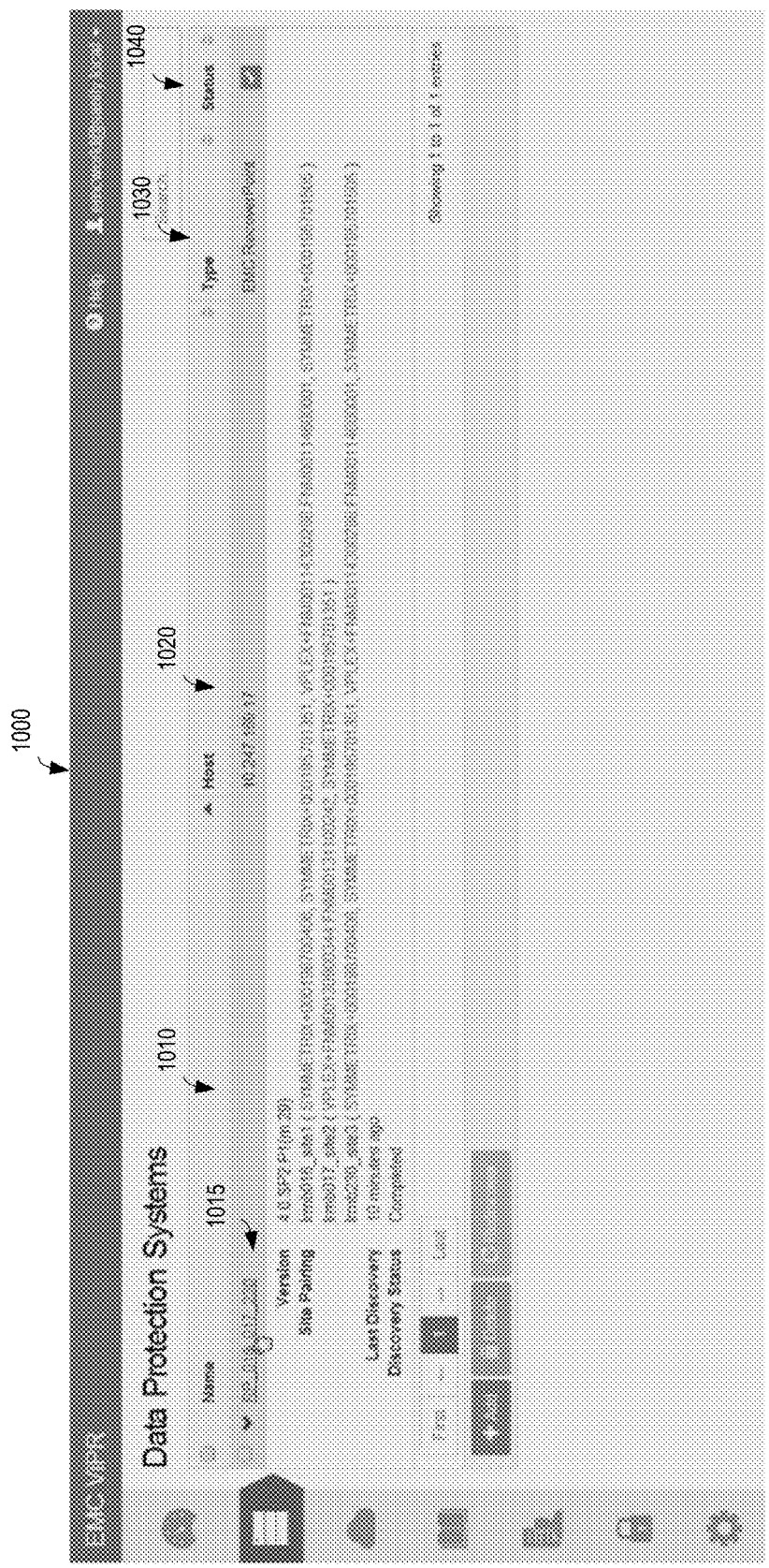
FIG. 10 is a screen shot of a graphical user interface illustrating a data protection system according to an example embodiment of the present invention.

FIG. 10 is a screen shot of a graphical user interface (GUI) 1000 illustrating a data protection system according to an example embodiment of the present invention. As illustrated in FIG. 10, the GUI 1000 may provide information regarding the data protection system 1015, such as data protection system name 1010, a host 1020 by which storage from the storage system is accessible, the data protection system type 1030 (e.g., EMC RecoverPoint), and the data protection system status 1040 (e.g., available, failure). The GUI 1000 also shows the storage systems (e.g., VPLEX and VMAX/Symmetrix) that are available for protection by the data protection system 1015.

Figure 11:
FIG. 11 is a screen shot of a graphical user interface for creating a virtual storage array according to an example embodiment of the present invention.

FIG. 11 is a screen shot of a graphical user interface (GUI) 1100 for creating a virtual storage array according to an example embodiment of the present invention. As illustrated in FIG. 11, an IT administrator may provide a name 1110 for the virtual array and, as will be described in greater detail below, assign a plurality of physical storage pools for later aggregation and use for creating virtual storage pools. As will be described below with reference to FIGS. 12 and 13A-13C, the IT administrator may add physical storage pools to the virtual storage array by adding networks 1150, adding storage ports 1160, adding storage pools 1170, and by adding storage systems 1180.

Figure 12:
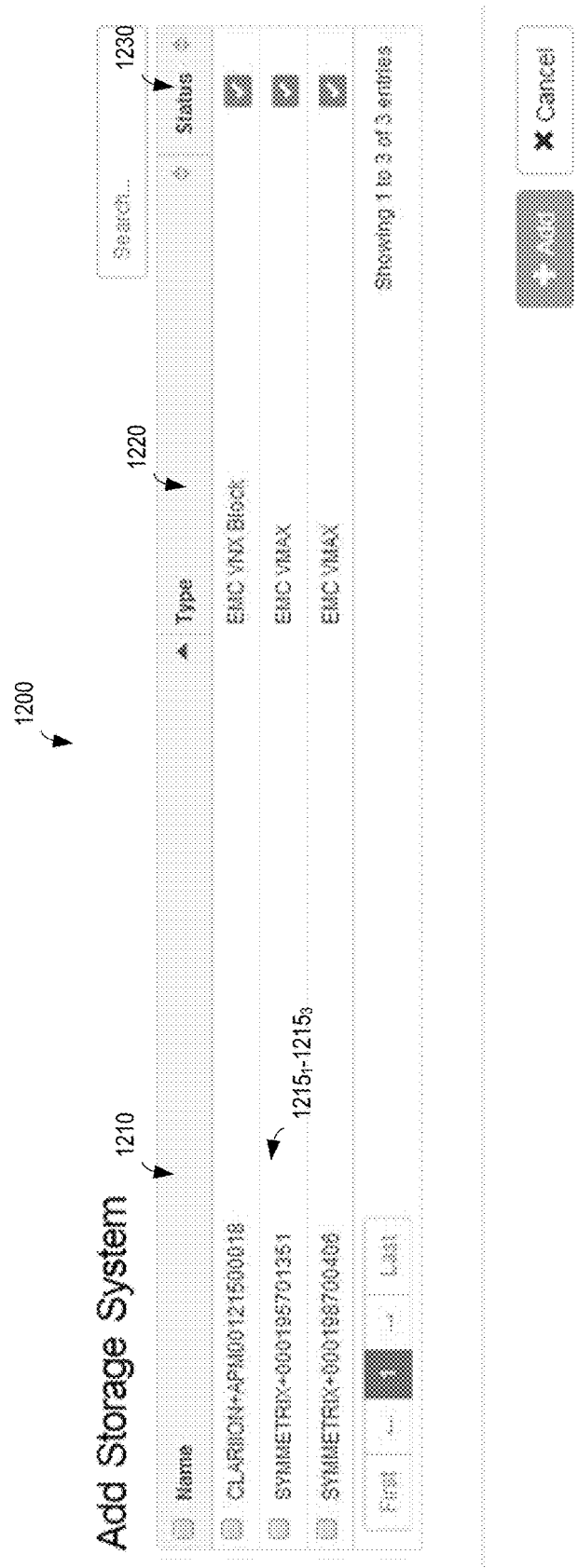
FIG. 12 is a screen shot of a graphical user interface for adding a storage system to a virtual storage array according to an example embodiment of the present invention.

FIG. 12 is a screen shot of a graphical user interface (GUI) 1200 for adding a storage system to a virtual storage array according to an example embodiment of the present invention. As illustrated in FIG. 12, the GUI 1200 displays a plurality of storage systems $1215_1$-$1215_3$ (1215 generally) that may be managed via the storage management API. The GUI 1200 displays information regarding the available storage systems 1215, such as name 1210, storage system type 1220 (e.g., VNX®, VMAX), and storage system status 1230. An IT administrator may select one or more of the available storage systems 1215 and add them to the virtual storage array.

Figures 13A, 13B, 13C:
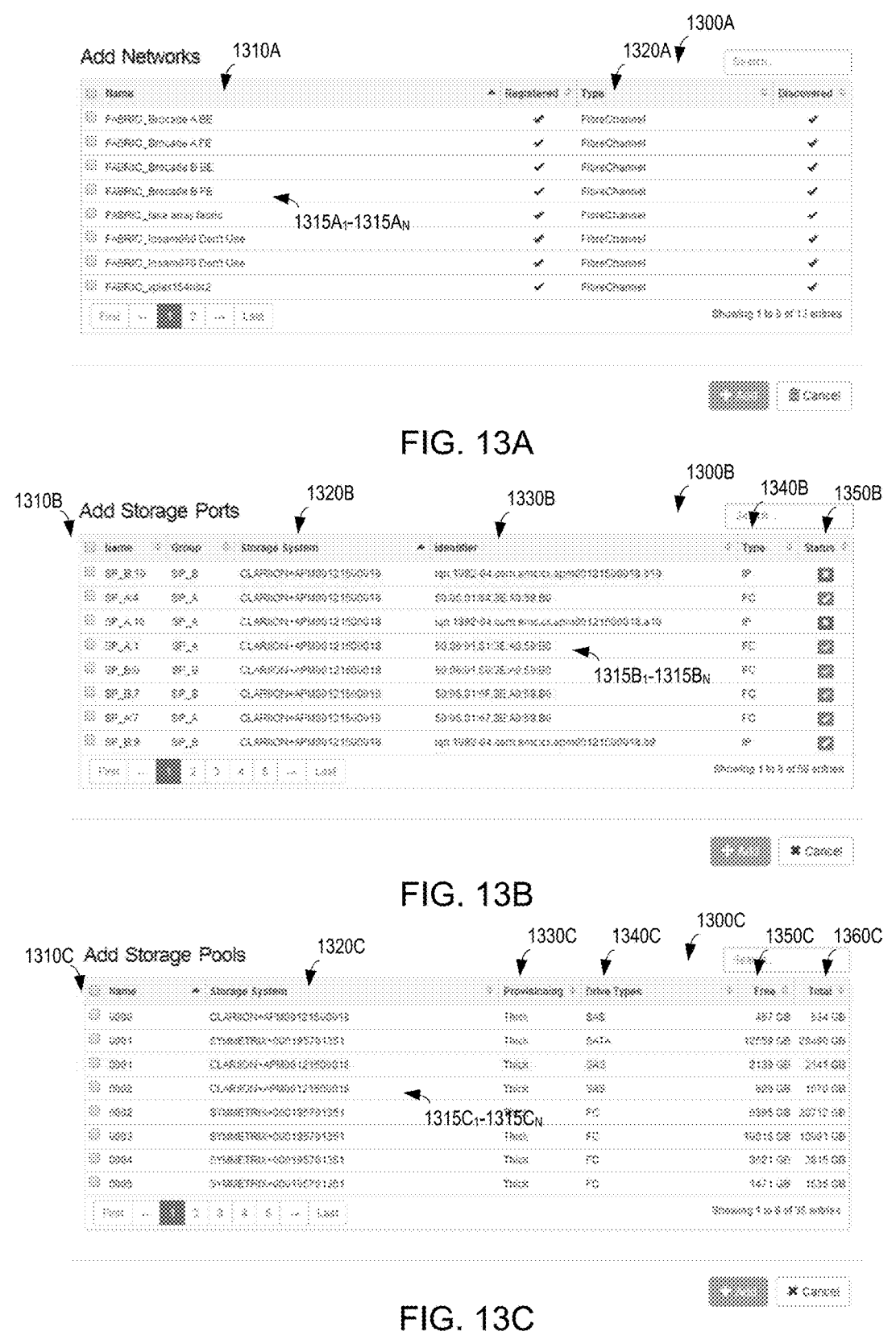

FIGS. 13A-13C are screen shots of respective graphical user interfaces (GUIs) 1300A, 1300B, 1300C for adding networks, storage ports, and storage pools according to example embodiments of the present invention.

As illustrated in FIG. 13A, the GUI 1300A displays a plurality of networks $1315A_1$-$1315A_N$ (1315A generally) that may be managed via the storage management API. The GUI 1300A displays information regarding the available networks 1315A, such as name 1310A and type 1320A. An IT administrator may select one or more of the available networks 1315A and add them to the virtual storage array.

As illustrated in FIG. 13B, the GUI 1300B displays a plurality of storage ports $1315B_1$-$1315B_N$ (1315B generally) that may be managed via the storage management API. The GUI 1300B displays information regarding the available networks 1315B, such as name 1310B, storage system 1320B, type 1340B, and port status 1350B. An IT administrator may select one or more of the available storage ports 1315B and add them to the virtual storage array.

As illustrated in FIG. 13C, the GUI 1300C displays a plurality of storage pools $1315C_1$-$1315C_N$ (1315C generally) that may be managed via the storage management API. The GUI 1300C displays information regarding the available storage pools 1315C, such as name 1310C, storage system 1320C, provisioning type 1330C, drive type 1340C, free space 1350C, and total space 1360C.

It should be understood that a virtual storage array aggregates the management of storage capacity (i.e., pools) and connectivity (i.e., ports). Storage pools and storage ports may be assigned directly to the virtual array (as in FIGS. 13B and 13C) or implicitly via network connectivity (as in FIG. 13A).

Figure 14:
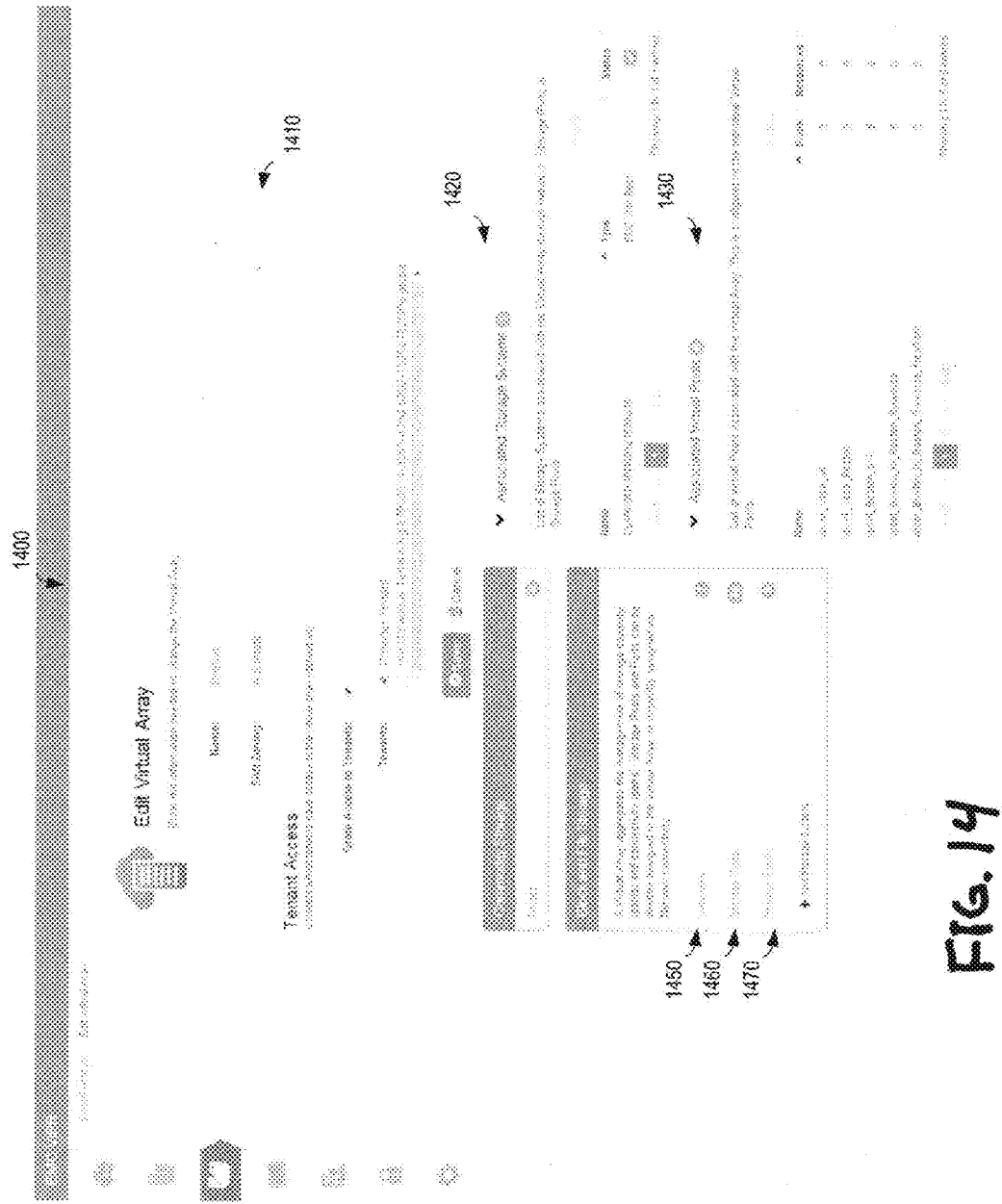
FIG. 14 is a screen shot of a graphical user interface illustrating a virtual storage array including a plurality of networks, a plurality of storage ports, and a plurality of storage pools according to an example embodiment of the present invention.

FIG. 14 is a screen shot of a graphical user interface (GUI) 1400 illustrating a virtual storage array including a plurality of networks 1450, a plurality of storage ports 1460, and a plurality of storage pools 1470 according to an example embodiment of the present invention. As illustrated in FIG. 14, there is one storage system 1420 associated with the virtual storage array and, after creating virtual storage pools, nine virtual storage pools 1430 associated with the virtual storage array. Further, there are two networks 1450, twenty-four storage ports 1460, and nine storage pools 1470 associated with the virtual storage array. These storage capacity (i.e., pools) and connectivity (i.e., ports) resource may be used by an IT administrator in creative virtual storage pools, as described below.

Figure 15:
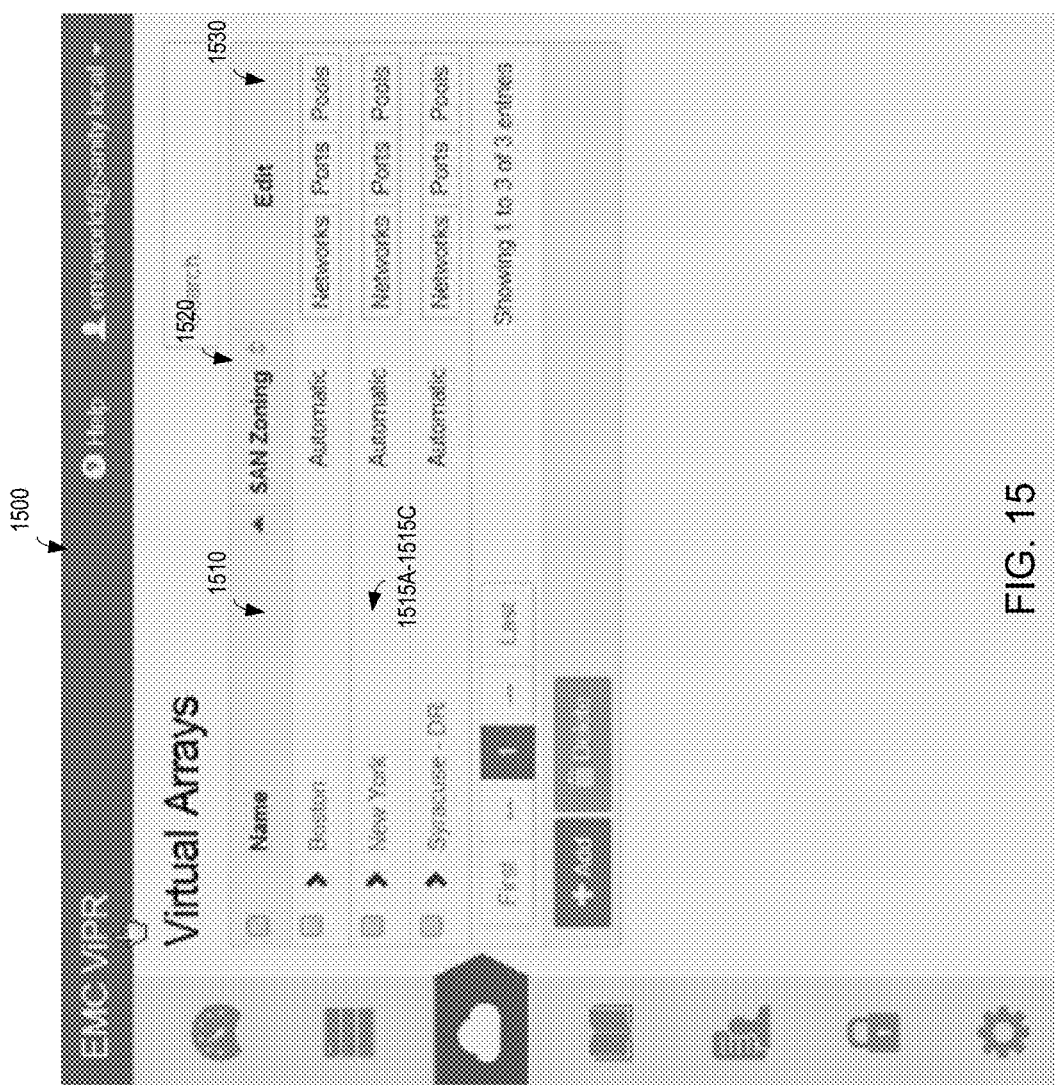
FIG. 15 is a screen shot of a graphical user interface illustrating a plurality of virtual storage arrays according to an example embodiment of the present invention.

FIG. 15 is a screen shot of a graphical user interface (GUI) 1500 illustrating a plurality of virtual storage arrays 1515A-1515C according to an example embodiment of the present invention. As illustrated in FIG. 15, there are three virtual storage arrays available: Boston 1515A (e.g., Site A virtual storage array 110A of FIG. 1 in the first active failure domain 115A), New York 1515B (e.g., Site B virtual storage array 110B of FIG. 1 in the second active failure domain 115B), and Syracuse-DR 1515C (e.g., Site C virtual storage array 110C of FIG. 1 in the passive failure domain 115C) (1515 generally). Each virtual storage array 1515 may have a plurality of attributes, including its data protection available for the virtual storage array and between which virtual storage arrays (e.g., remote replication between New York and Syracuse-DR), protocols (e.g., fibre channel, iSCSI) supported by the virtual storage array, storage system types comprising the virtual storage array (e.g., VMAX, VPLEX), RAID levels supported by the virtual storage array (e.g., RAID1, RAID5, RAID6), and drive types available on the virtual storage array (i.e., available on the storage systems comprising the virtual storage array) (e.g., fibre channel (FC), serial ATA (SATA), solid state drive (SSD)). Further, as illustrated in FIG. 15, the GUI 1500 may provide information regarding the virtual storage arrays 1515, such as virtual storage array name 1510 (e.g., Boston, New York, Syracuse-DR), SAN zoning support by the virtual storage array 1520, and the ability to edit 1530 the networks, ports, and pools comprising the virtual storage array.

Figure 16:
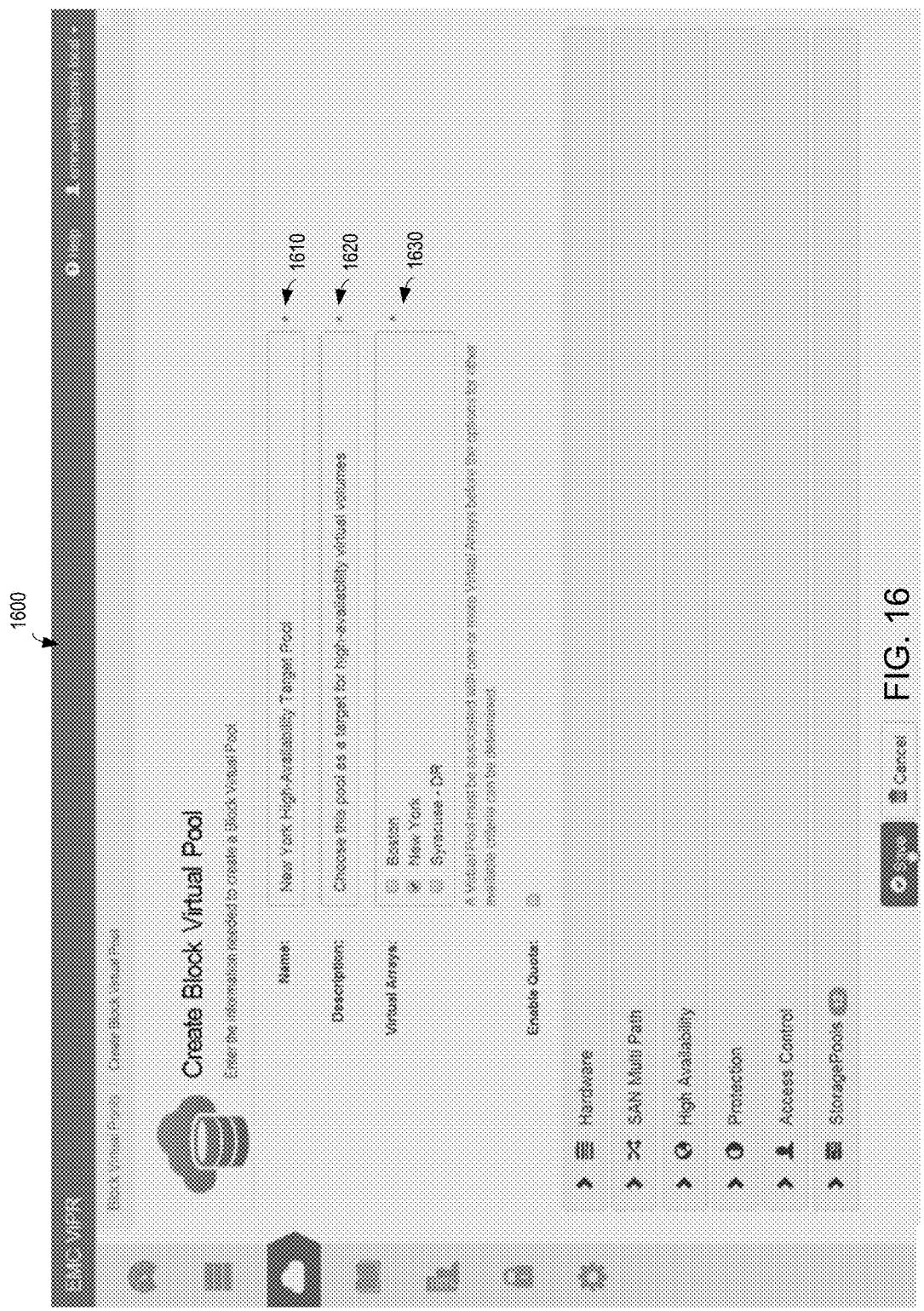
FIG. 16 is a screen shot of a graphical user interface for creating a virtual storage pool for high availability according to an example embodiment of the present invention.

FIG. 16 is a screen shot of a graphical user interface (GUI) 1600 for creating a virtual storage pool for high availability according to an example embodiment of the present invention. In other words, the GUI 1600 of FIG. 16 illustrates inputs for creating a high availability virtual storage pool representing storage that will be used for virtualized/distributed storage. The virtual storage pool may be given a name 1610 (e.g., "New York High-Availability Target Pool") and a description 1620 (e.g., "Choose this pool as a target for high-availability virtual volumes"), and a virtual storage array 1630 (e.g., New York) may be selected to determine from which virtual storage array the resources for the virtual storage pool should come. In some embodiments, the storage system type (e.g., VMAX) may be defined, further limiting the type of storage system in the selected virtual storage array that may be used for storage selected for the virtual storage pool.

Figure 17:
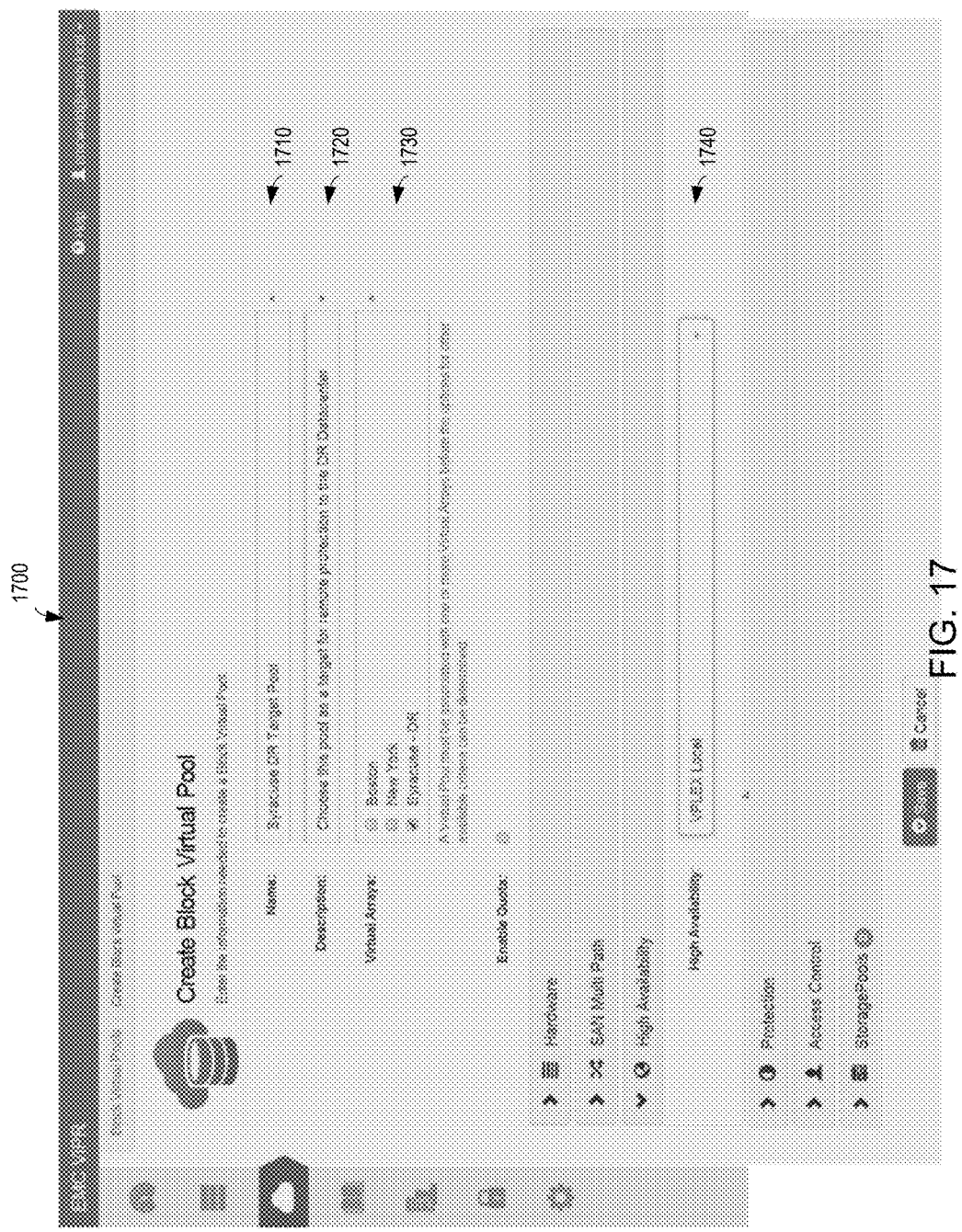
FIG. 17 is a screen shot of a graphical user interface for creating a virtual storage pool for data replication according to an example embodiment of the present invention.

FIG. 17 is a screen shot of a graphical user interface (GUI) 1700 for creating a virtual storage pool for data replication according to an example embodiment of the present invention. In other words, the GUI 1700 of FIG. 17 illustrates inputs for creating a data replication virtual storage pool representing storage that will be used for data replication. The virtual storage pool may be given a name 1710 (e.g., "Syracuse DR Target Pool") and a description 1720 (e.g., "Choose this pool as a target for remote protection to the DR Datacenter"), and a virtual storage array 1730 (e.g., Syracuse-DR) may be selected to determine from which virtual storage array the resources for the virtual storage pool should come. Further, the type of high availability 1740 (e.g., VPLEX Local) may be defined.

Figure 18:
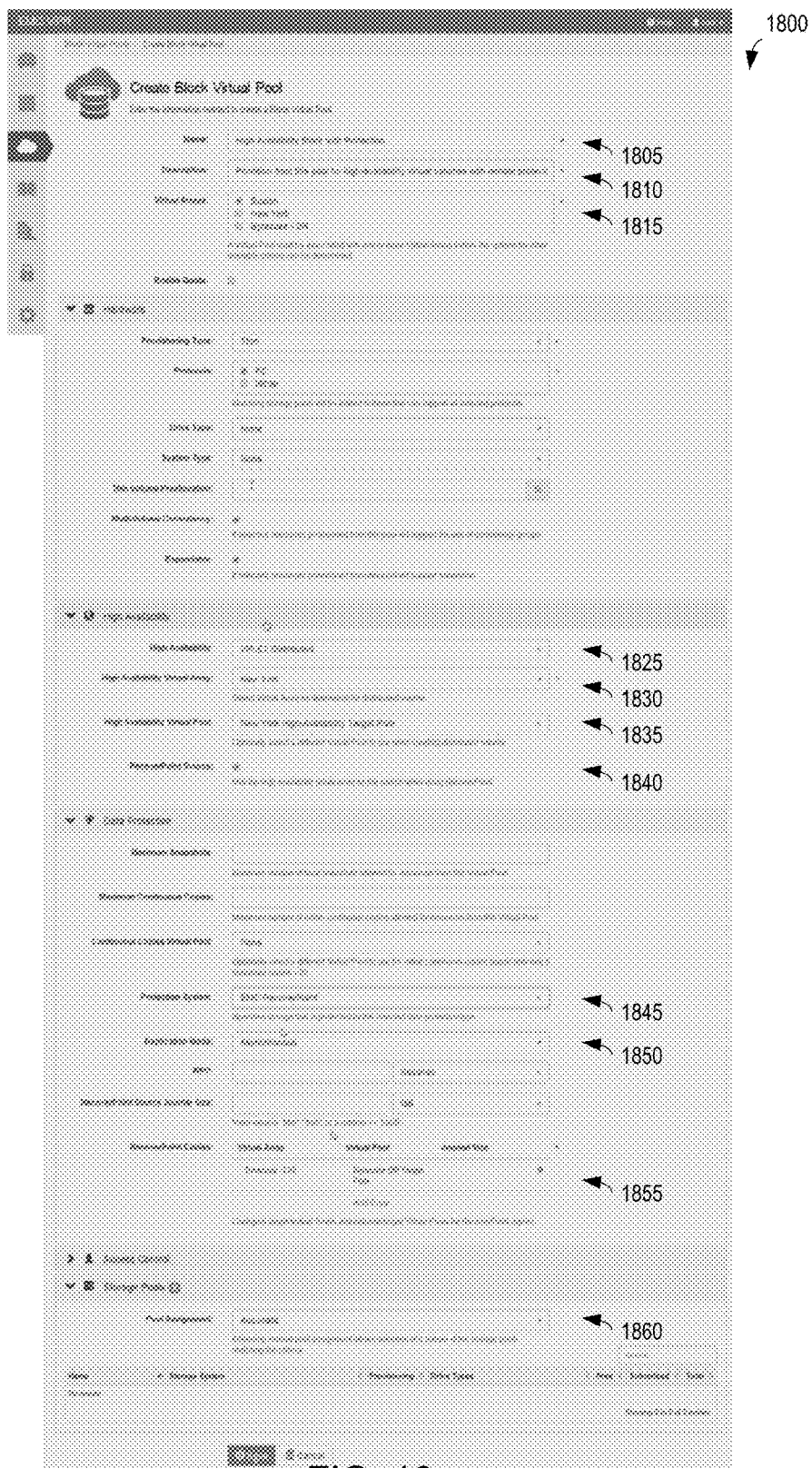
FIG. 18 is a screen shot of a graphical user interface for creating a virtual storage pool for provisioning requests that require high availability and data replication according to an example embodiment of the present invention.

FIG. 18 is a screen shot of a graphical user interface (GUI) 1800 for creating a virtual storage pool for provisioning requests that require high availability and data replication according to an example embodiment of the present invention. In other words, the GUI 1800 of FIG. 18 illustrates inputs for creating a source virtual storage pool representing storage that will be used for storage provisioning and, as described in greater detail below, with both high availability and data protection. The virtual storage pool may be given a name 1805 (e.g., "High-Availability Block with Protection") and a description 1810 (e.g., "Provision form this pool for high-availability virtual volumes with remote protection"), and a virtual storage array 1815 (e.g., Boston) may be selected to determine from which virtual storage array the resources for the virtual storage pool should come.

The IT administrator also may define high availability for storage provisioned out of the virtual storage pool by selecting the type of high availability 1825 (e.g., VPLEX Distributed), a high availability virtual array 1830 (e.g., New York) (which may be defined as the high availability source 1840 when using RecoverPoint), and a high availability virtual pool 1835 (e.g., New York High-Availability Target Pool, created in FIG. 16). The IT administrator also may define data protection for storage provisioned out of the virtual storage pool by selecting a type of protection system 1845 (e.g., EMC RecoverPoint), a replication mode 1850 (e.g., asynchronous), and a replication target virtual storage array (e.g., Syracuse-DR) and a replication target virtual storage pool (e.g., Syracuse DR Target Pool created in FIG. 17) 1855.

The storage management API 105 orchestrates the creation of the protected VPLEX volume. The storage management API 105 creates the source and target VPLEX virtual volumes, as well as the source and target journal volumes. In a preferred embodiment, virtual volumes requiring protection should be included in a consistency group for replication to the replication site by, for example, RecoverPoint. The storage management API 105 then exports the volumes to their respective sites, masks the volumes on each site, and creates a consistency group with those volumes.

In certain embodiments, the storage management API may determine which physical storage pool(s) in the selected virtual storage array(s) satisfy the provided attributes. In a preferred embodiment, certain attributes are required for creation of a virtual storage pool: protocol, a selection of virtual arrays, volume provisioning type (e.g., thin, thick), and multipathing (e.g., enabled, disabled). It should be understood that, while these are required attributes in the preferred embodiment, this does not mean that, for example, multipathing need be enabled; rather, only an indication regarding the attribute (e.g., multipathing is either enabled or disabled) is required. Other attributes may function as filters to further refine the resulting physical storage pools that satisfy the attributes: storage system type (e.g., VMAX), RAID level (e.g., RAID0, RAID1, RAID5, RAID6), storage drive type (e.g., fibre channel (FC), serial ATA (SATA), solid state drive (SSD), and storage tiering policy.

After applying the mandatory attributes and filter attributes to the physical storage pool filtering process described above, a plurality of physical storage pools may be returned. In certain embodiments, pool assignment from the plurality of physical storage pools may be done automatically or one or more physical storage pools may be selected for inclusion in the virtual storage pool. It should be understood that each of the returned physical storage pools satisfies the criteria established by the attributes provided by the IT administrator creating the virtual storage pool. The GUI may provide information regarding each physical storage pool including its name, the storage system on which it resides, the provisioning type, the drive types used in the physical storage pool, the amount of free space in the physical storage pool, the amount of storage subscribed to in the physical storage pool, and the total space in the physical storage pool.

The storage management API then may determine which physical storage pool(s) in the selected virtual storage array(s) satisfy the provided attributes. In a preferred embodiment, certain attributes are required for creation of a virtual storage pool: protocol, a selection of virtual arrays, volume provisioning type (e.g., thin, thick), and multipathing (e.g., enabled, disabled). It should be understood that, while these are required attributes in the preferred embodiment, this does not mean that, for example, multipathing need be enabled; rather, only an indication regarding the attribute (e.g., multipathing is either enabled or disabled) is required. Other attributes may function as filters to further refine the resulting physical storage pools that satisfy the attributes: storage system type (e.g., VMAX), RAID level (e.g., RAID0, RAID1, RAID5, RAID6), storage drive type (e.g., fibre channel (FC), serial ATA (SATA), solid state drive (SSD), and storage tiering policy.

The storage management API checks the connectivity of the protection system (e.g., RecoverPoint) and the storage array associated with the physical storage pools selected. The storage management API determines the physical storage pools that can be protected by the same protection system. The storage management API determines the physical storage pools that represent a single copy in each virtual storage array as specified by the provided attributes in the virtual storage pool. The storage management API validates the physical storage pools utilize each protection appliance 127 at most once corresponding to one target copy per virtual storage array.

Figure 19:
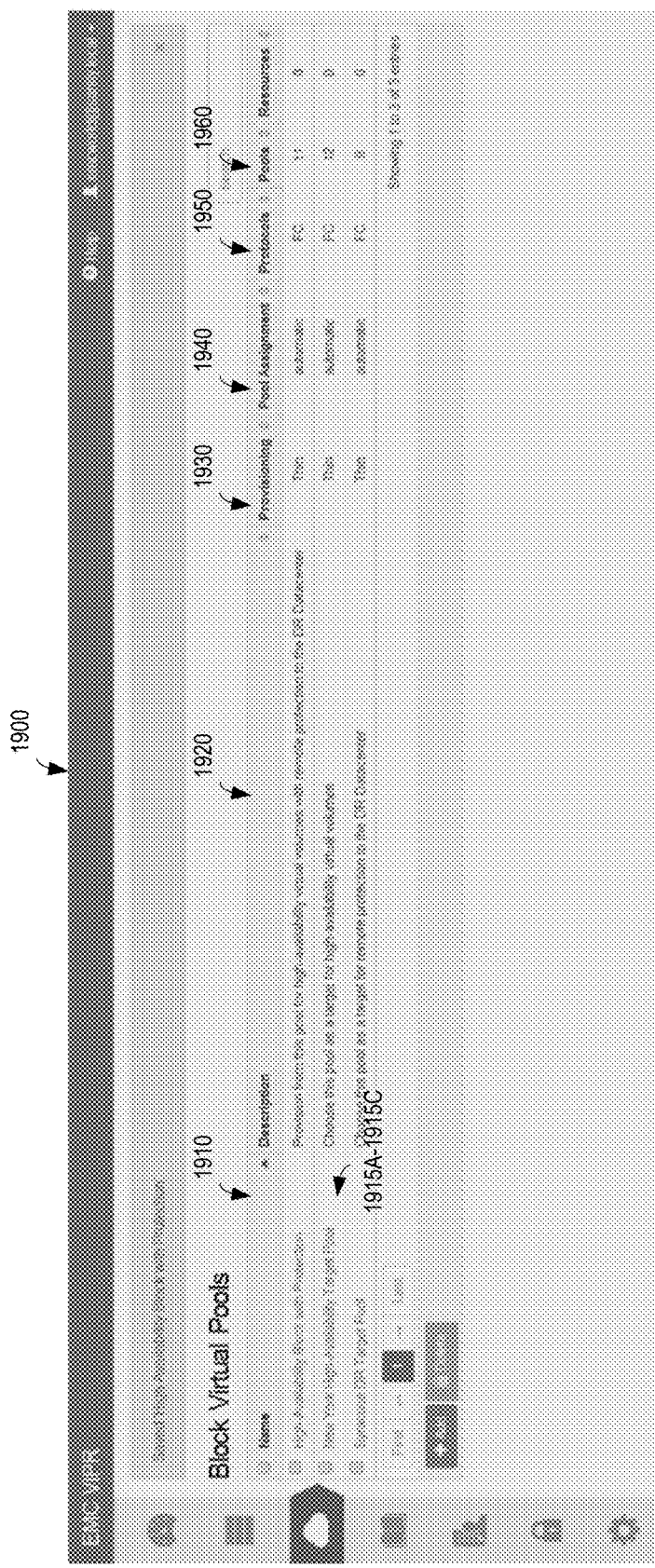
FIG. 19 is a screen shot of a graphical user interface illustrating the virtual storage pools created in FIGS. 16-19 according to an example embodiment of the present invention.

FIG. 19 is a screen shot of a graphical user interface (GUI) 1900 illustrating the virtual storage pools created in FIGS. 16-18 (e.g., "High-Availability Block with Protection" 1915A for creating volumes requiring high availability and remote protection, "New York High-Availability Target Pool" 1915B for creating target pools for high availability virtual volumes, and "Syracuse DR Target Pool" 1915C for creating replication target volumes) (1915 generally) according to an example embodiment of the present invention. As illustrated in FIG. 19, the GUI 1900 displays information regarding the virtual storage pools 1915 provided when creating the virtual storage pool (i.e., in FIGS. 16-18) including virtual storage pool name 1910, virtual storage pool description 1920, the provisioning type 1930, the pool assignment (e.g., automatic, manual) 1940, the supported protocols 1950, and the number of physical storage pools in the virtual storage pool 1960.

Figure 20:
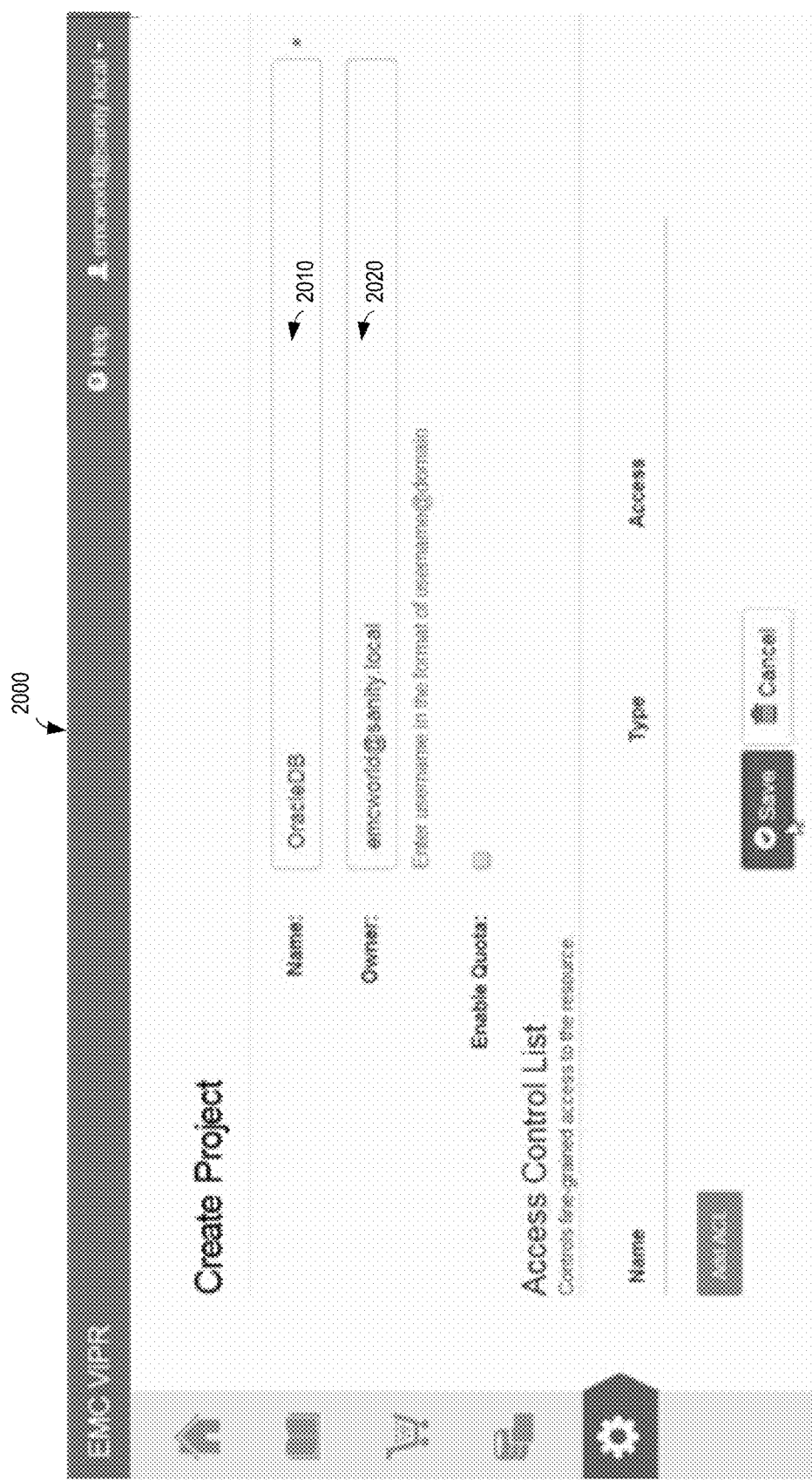
FIG. 20 is a screen shot of a graphical user interface for creating a project according to an example embodiment of the present invention.

FIG. 20 is a screen shot of a graphical user interface (GUI) 2000 for creating a project according to an example embodiment of the present invention. As illustrated in FIG. 20, a project having a project name 2010 and a project owner 2020 may be created. A project is a resource organization abstraction that logically groups resources provisioned from different data services. Users can create their own projects, and they can associate multiple resources from different services with them. Resources from one project can be shared between multiple users under the same tenant. Users can associate resources provisioned from one or multiple services with a project. Projects allow users to create logical groupings of different types of resources. Different users can access resources that are associated with the same project. It should be understood that, in a preferred embodiment, access to resources is managed by the access control list (ACL) for the resources and not by the projects. Further, in certain embodiments, resource usage may be metered and may be reported per project, so users and tenant admins can get usage information itemized by project.

Figure 21:
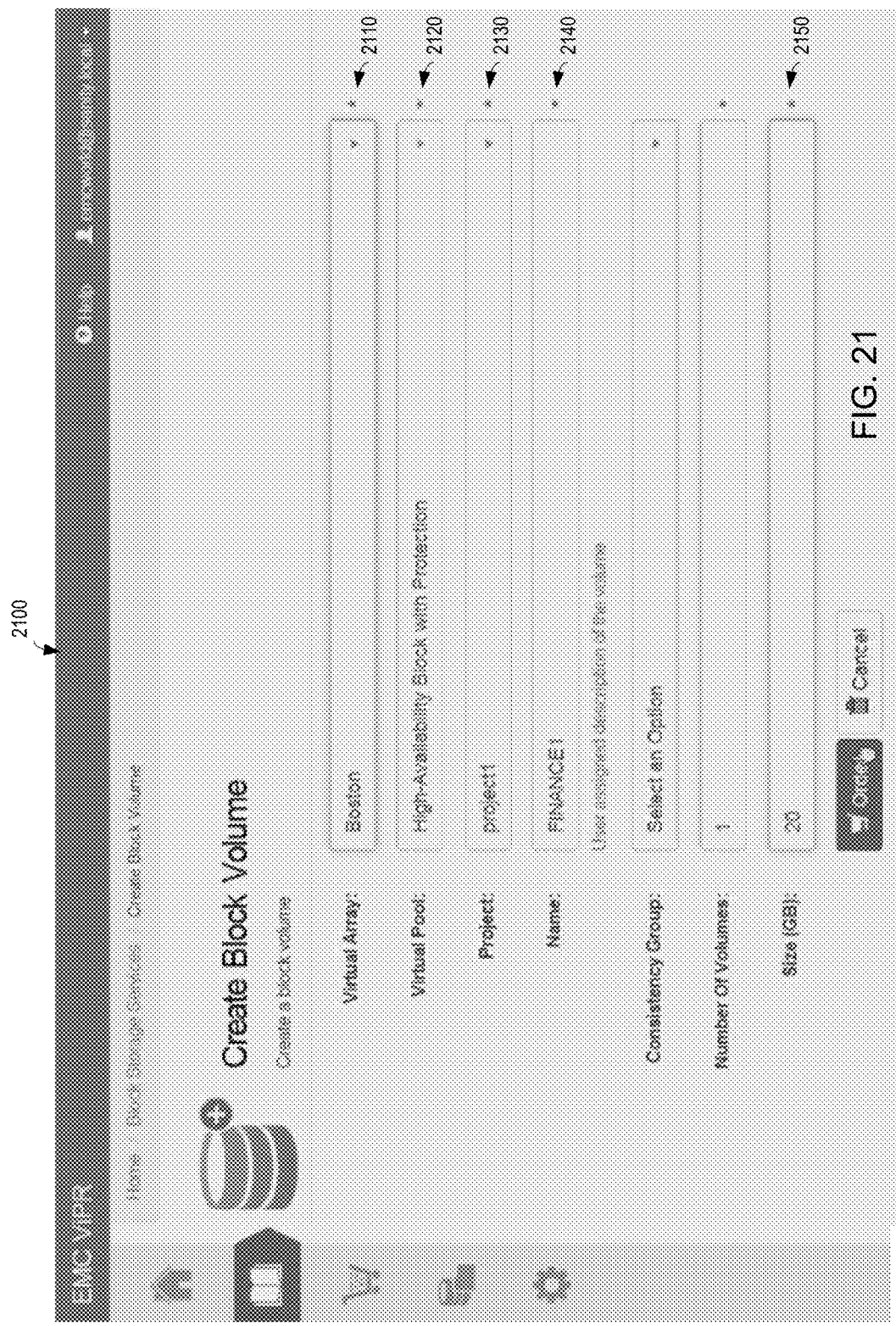
FIG. 21 is a screen shot of a graphical user interface for creating a volume from the virtual storage pool created in FIG. 19 according to an example embodiment of the present invention.

FIG. 21 is a screen shot of a graphical user interface (GUI) 2100 for creating a volume for a host from the virtual storage pool created in FIG. 19 according to an example embodiment of the present invention. As illustrated in FIG. 21, the volume may be created out of the Boston virtual array 2110 and the High-Availability Block with Protection virtual pool 2120, thereby causing the storage management API 105 to create three volumes: the source volume having both high availability and protection, the target high availability volume, and the replication target volume. Further, the volume may be created as part of a project 2130 (e.g., project1), given a name 2140 (e.g., FINANCE1), and a size 2150.

Figure 22:
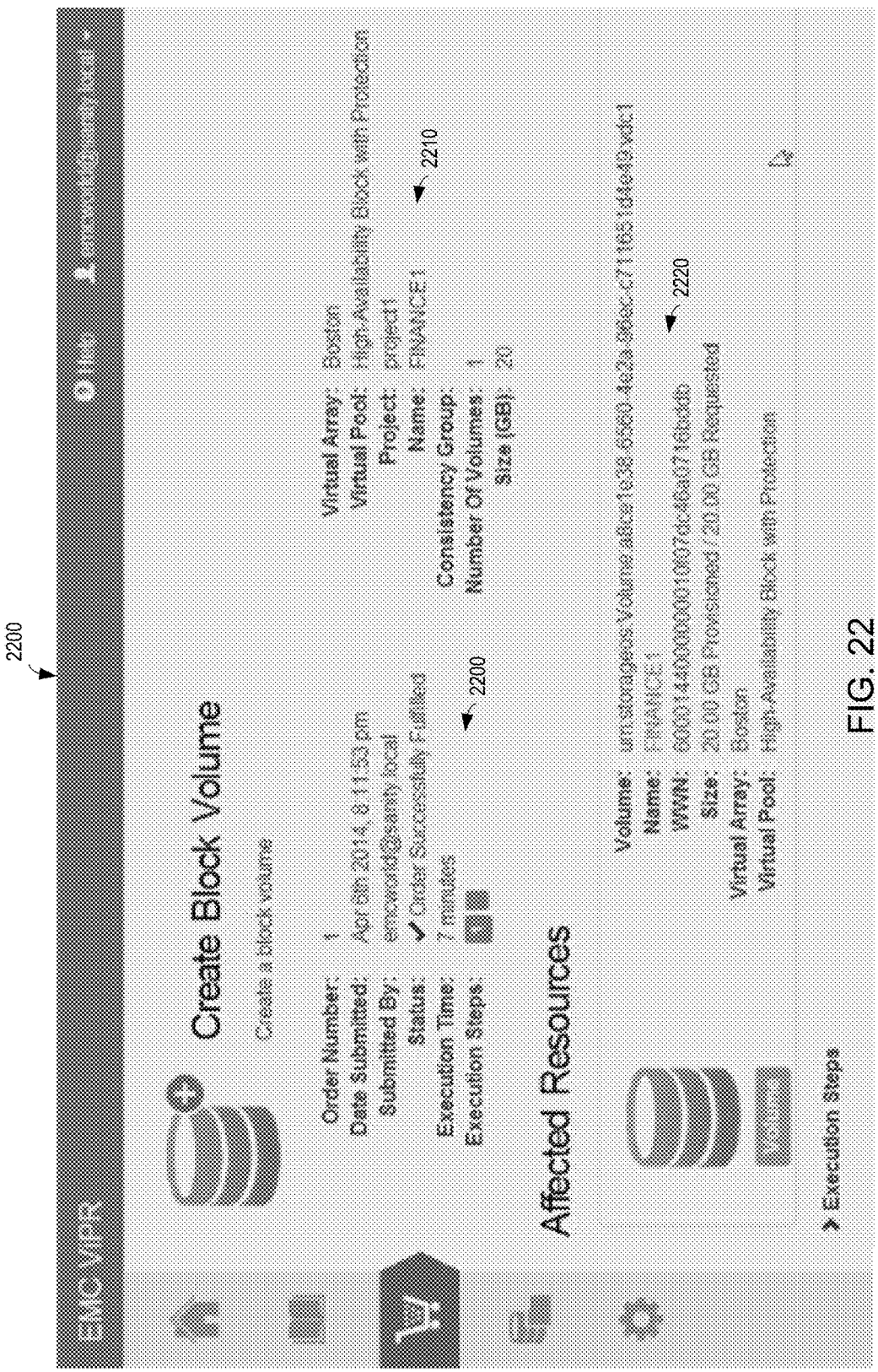
FIG. 22 is a screen shot of a graphical user interface illustrating a result of creating the volume in FIG. 21 according to an example embodiment of the present invention.

FIG. 22 is a screen shot of a graphical user interface (GUI) 2200 illustrating a result of creating the volume in FIG. 21 according to an example embodiment of the present invention. As illustrated in FIG. 22, the storage management API has orchestrated a number of steps in the background. First, the storage management created a source side (i.e., Site A) volume having the attributes provided in FIG. 21 named "FINANCE1" and has exported the volume to the specified host. Additionally, because the "FINANCE1" volume was created out of the "High-Availability Block with Protection" virtual storage pool on the "Boston" virtual storage array, the storage management API also created a target side (i.e., Site B) data high availability volume "FINANCE1target" and a replication target side (i.e., Site C) data replication volume "FINANCE1targetSyracuseDR" and added the "FINANCE1", "FINANCE1target", and "FINANCE1- target-SyracuseDR" volumes to a consistency group. Additionally, the storage management API 105 creates volumes in the backing stores of the virtualization devices, virtual volumes in the virtualization devices, and protections in the replication appliances.

Figure 23:
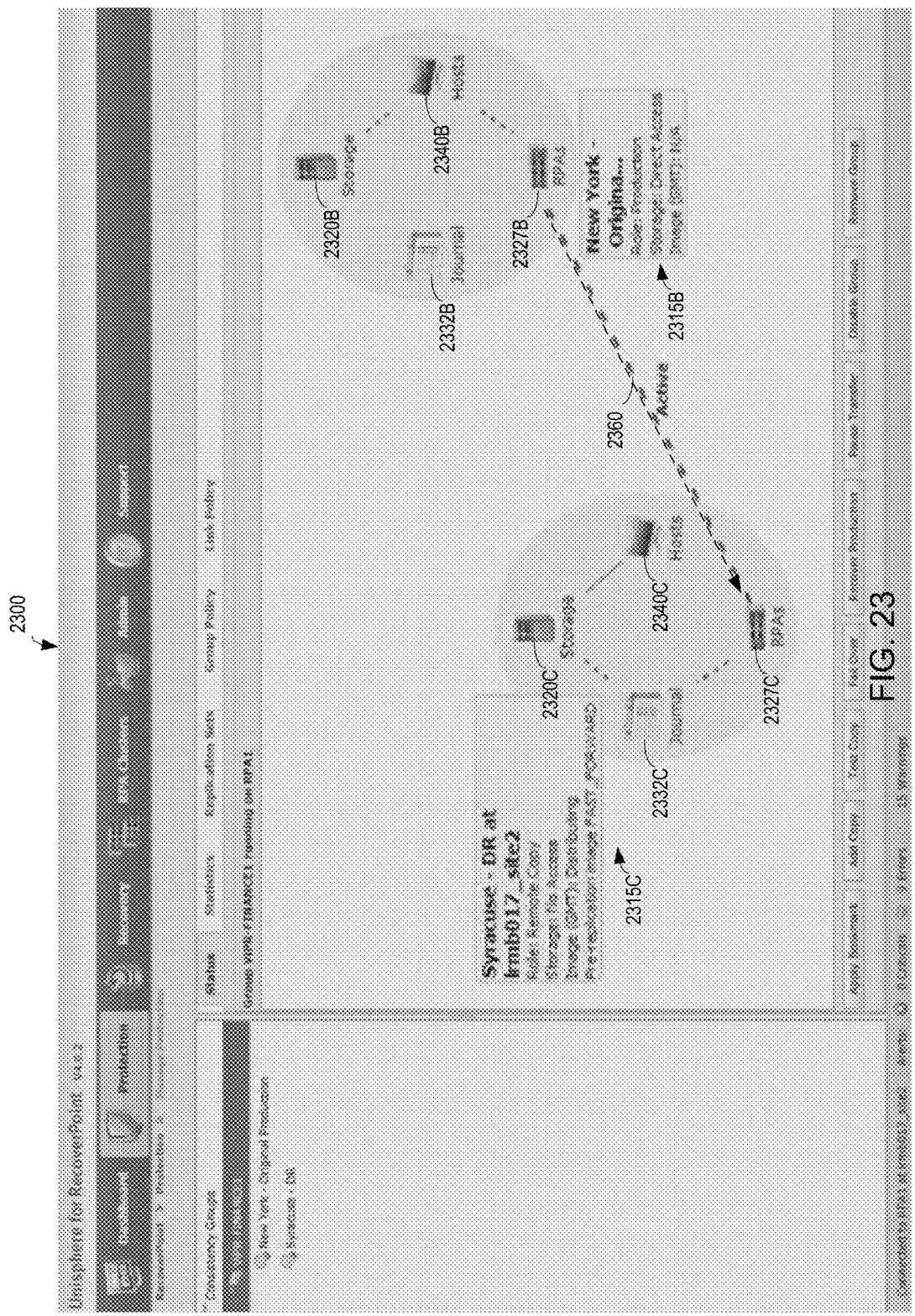
FIG. 23 is a screen shot of a graphical user interface illustrating a remote replication environment created as a result of creating the volume in FIG. 21 according to an example embodiment of the present invention.

FIG. 23 is a screen shot of a graphical user interface (GUI) 2300 illustrating a remote replication environment including a remote replication consistency group created as a result of creating the volume in FIG. 21 according to an example embodiment of the present invention. As illustrated in FIG. 23, there is a replication production site 2315B (e.g., Site B—New York 115B of FIG. 1) and a remote copy site 2315C (e.g., Site C—Syracuse-DR 115C of FIG. 1). The replication production site 2315B includes one or more replication appliances 2327B (e.g., RPA 127B of FIG. 1) with their associated journal volume 2332B (e.g., JRNL 132B of FIG. 1), one or more hosts 2340B (e.g., active hosts 140B of FIG. 1), and storage 2320B (e.g., storage array 120B of FIG. 1). Similarly, the remote copy site 2315C includes one or more replication appliances 2327C (e.g., RPA 127C of FIG. 1) with their associated journal volume 2332C (e.g., JRNL 132C of FIG. 1), one or more hosts 2340C (e.g., standby hosts 140C of FIG. 1), and storage 2320C (e.g., storage array 120C of FIG. 1). As illustrated in FIG. 23, replication of I/Os is active from the production site 2315B to the replication site 2315C. Example embodiments of the present invention now have a protected virtual volume.

Figure 24:
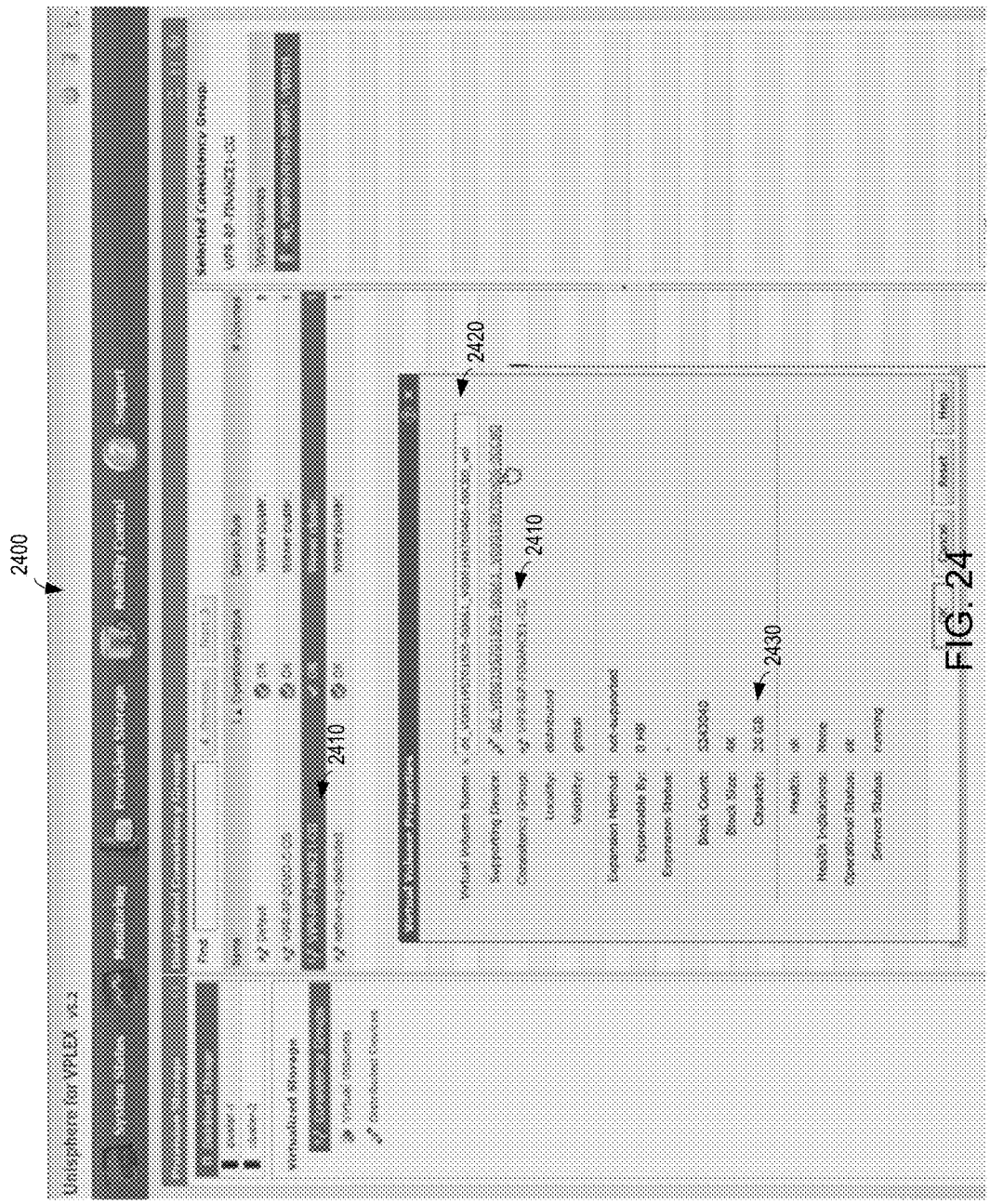
FIG. 24 is a screen shot of a graphical user interface illustrating a consistency group created as a result of creating the volume in FIG. 21 according to an example embodiment of the present invention.

FIG. 24 is a screen shot of a graphical user interface (GUI) 2400 illustrating a virtual volume consistency group 2410 created as a result of creating the volume for the host in FIG. 21 according to an example embodiment of the present invention. As illustrated in FIG. 24, a consistency group "VIPR-RP-FINANCE1-CG" 2410 has been created as requested in FIG. 21 located both distributed storage clusters (e.g., Site A—Boston 115A of FIG. 1 and Site B—New York 115B of FIG. 1) and is, therefore, a high availability volume. Additionally, the GUI 2400 shows that a virtual volume 2420 having the requested capacity 2430 has been created with backing stores on two storage arrays (e.g., storage arrays 120 of FIG. 1) (as determined by virtue of its label, "V000195701505-00661_V000198700406-00C8D") associated with respective "legs" (i.e. sites) (e.g., Site A—Boston 115A of FIG. 1 and Site B—New York 115B of FIG. 1) of the distributed storage system (e.g., VPLEX Metro).

Figure 25:
FIG. 25 is a screen shot of a graphical user interface illustrating a journal volume created at the source site as a result of creating the volume in FIG. 21 according to an example embodiment of the present invention.

FIG. 25 is a screen shot of a graphical user interface (GUI) 2500 illustrating a journal volume 2520 created at the source site as a result of creating the volume for the host in FIG. 21 according to an example embodiment of the present invention. As illustrated in FIG. 25, in a preferred embodiment of the present invention, in examining the primary site (e.g., Site B—New York 115B of FIG. 1) of the distributed storage system (e.g., VPLEX Metro distributed storage system of Site A—Boston 115A of FIG. 1 and Site B—New York 115B of FIG. 1), the journal volume 2520 created in the replication consistency group for the journal volume 2510 (e.g., FINANCE1sourcejournal-CG) is a local volume (i.e., it is not a high availability volume accessible at both "legs" (i.e., sites) (e.g., Site A—Boston 115A of FIG. 1 and Site B—New York 115B of FIG. 1) of the distributed storage system (e.g., VPLEX Metro)). Rather, the journal volume 2510 is only available at the primary site of the distributed storage system (e.g., Site B—New York 115B of FIG. 1) for replication as part of the production site of the remote replication environment to the replication site (e.g., Site C—Syracuse-DR 115C of FIG. 1). In a preferred embodiment of the present invention, creating the journal volume as a local volume (i.e., not a high availability volume) is prescribed in RecoverPoint best practices.

Figure 26:
FIG. 26 is a screen shot of a graphical user interface illustrating a consistency group created in the remote replication environment as a result of creating the volume for the host in FIG. 21 according to an example embodiment of the present invention.

FIG. 26 is a screen shot of a graphical user interface (GUI) 2600 illustrating a consistency group 2620 created in the remote replication environment as a result of creating the volume for the host in FIG. 21 according to an example embodiment of the present invention. As illustrated in FIG. 26, a consistency group "FINANCE1targetSyracuseDR" 2610 has been created as requested in FIG. 21 located in both remote replication sites (e.g., Site B—New York 115B of FIG. 1 and Site C—Syracuse-DR 115C of FIG. 1 and). Additionally, the GUI 2600 shows that a virtual volume 2620 having the requested capacity 2630 has been created with backing stores on a storage array (e.g., storage array 120 of FIG. 1) (as determined by virtue of its label, "V000195701351-0224B") associated with the remote replication site (e.g., Site C—Syracuse-DR 115C of FIG. 1). Further, as illustrated in FIG. 26, the virtual volume 2620 a local volume 2640 (i.e., not a high availability volume) as requested when establishing the remote replication virtual storage pool (e.g., high availability attribute selection 1740 of FIG. 17).

Figure 27:
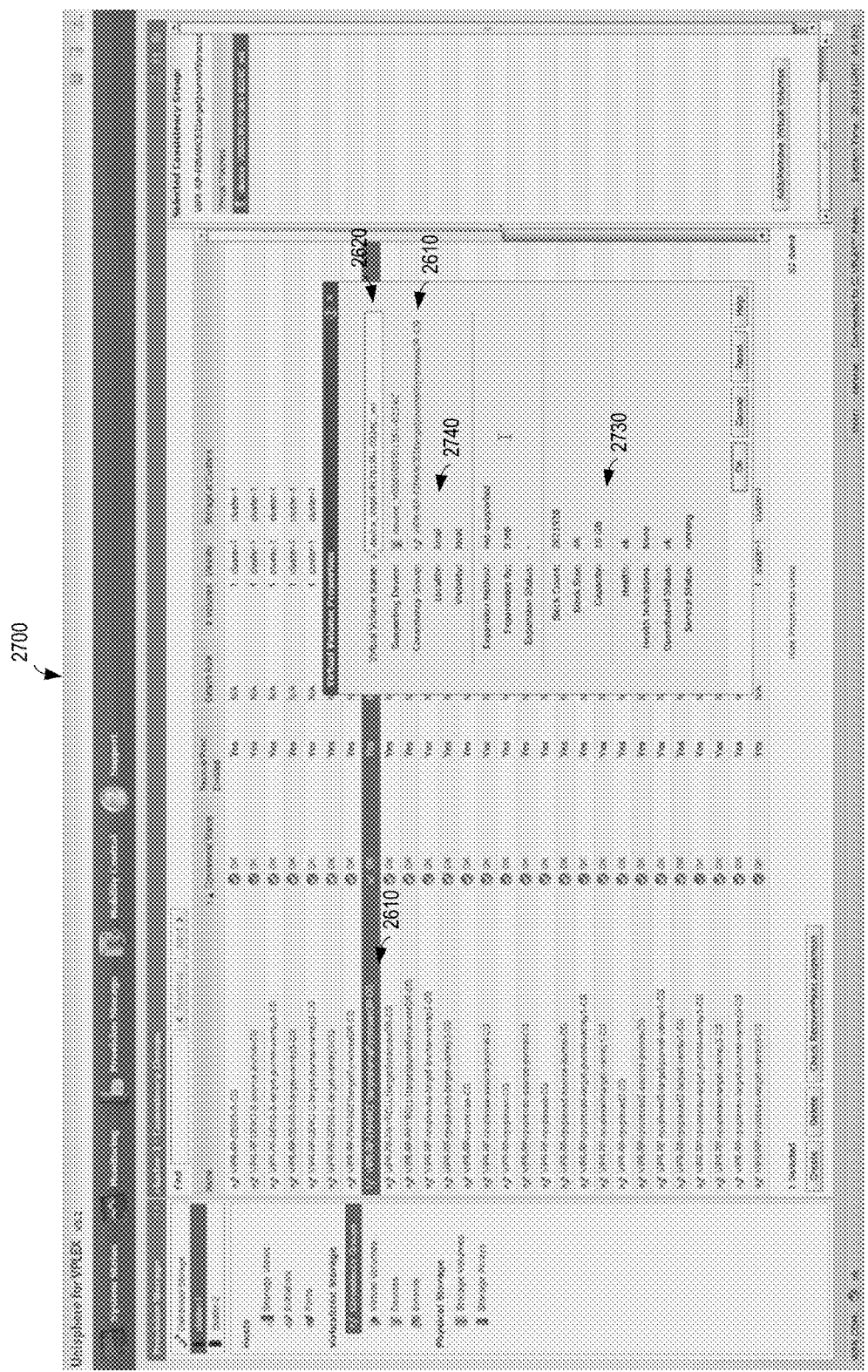
FIG. 27 is a screen shot of a graphical user interface illustrating a journal volume created at the target site as a result of creating the volume in FIG. 21 according to an example embodiment of the present invention.

FIG. 27 is a screen shot of a graphical user interface (GUI) 2700 illustrating a journal volume 2720 created at the target site as a result of creating the volume for the host in FIG. 21 according to an example embodiment of the present invention. As illustrated in FIG. 27, a consistency group "FINANCE 1targetjournalSyracuseDR" 2710 has been created as requested in FIG. 21 located in both remote replication sites (e.g., Site B—New York 115B of FIG. 1 and Site C—Syracuse-DR 115C of FIG. 1 and). Additionally, the GUI 2700 shows that a virtual volume 2720 for the remote replication journal has been created with backing stores on a storage array (e.g., storage array 120 of FIG. 1) (as determined by virtue of its label, "V0001957013151-0224C") associated with the remote replication site (e.g., Site C—Syracuse-DR 115C of FIG. 1). Further, as illustrated in FIG. 27, and as expected for a journal volume 2720 for remote replication, the volume is a local volume 2740 (i.e., not a high availability volume).

Figure 28:
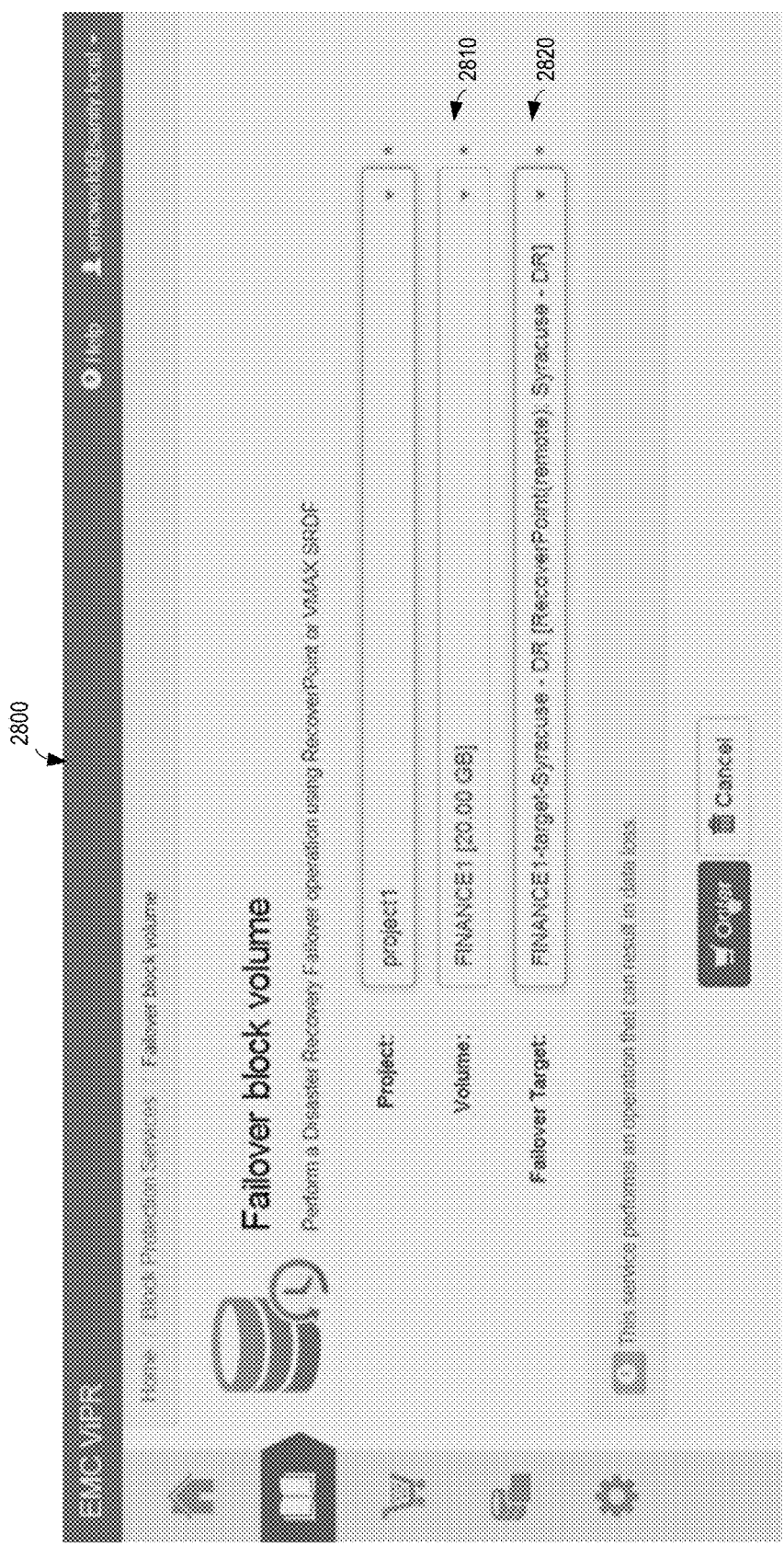
FIG. 28 is a screen shot of a graphical user interface for performing failover from a production volume to a replication volume according to an example embodiment of the present invention.

FIG. 28 is a screen shot of a graphical user interface (GUI) 2800 for performing failover from a production volume to a replication volume according to an example embodiment of the present invention. As illustrated in FIG. 28, an IT administrator may select a volume 2810 (e.g., FINANCE1) and a failover target 2820 (e.g., FINANCE1-target-Syracuse-DR) for failover. The storage management API 105 then may orchestrate the failover, pausing replication and changing the properties of the replication volume to the production volume.

Figure 29:
FIG. 29 is a screen shot of a graphical user interface illustrating a remote replication environment in a failover state as a result of performing a failover in FIG. 28 according to an example embodiment of the present invention.

FIG. 29 is a screen shot of a graphical user interface (GUI) 2900 illustrating a remote replication environment in a failover state as a result of performing a failover in FIG. 28 according to an example embodiment of the present invention. As illustrated in FIG. 29, and in contrast with FIG. 23, there is a replication production site 2915C (e.g., Site C—Syracuse-DR 115C of FIG. 1) and a remote copy site 2915B (e.g., Site B—New York 115B of FIG. 1). The replication production site 2915C includes one or more replication appliances 2927C (e.g., RPA 127C of FIG. 1) with their associated journal volume 2932C (e.g., JRNL 132C of FIG. 1), one or more hosts 2940C (e.g., active hosts 140C of FIG. 1), and storage 2920C (e.g., storage array 120C of FIG. 1). Similarly, the remote copy site 2915B includes one or more replication appliances 2927B (e.g., RPA 127B of FIG. 1) with their associated journal volume 2932B (e.g., JRNL 132B of FIG. 1), one or more hosts 2940B (e.g., standby hosts 140B of FIG. 1), and storage 2920B (e.g., storage array 120B of FIG. 1). As illustrated in FIG. 29, replication of I/Os is active from the production site 2915C to the replication site 2915B. Example embodiments of the present invention now have a failover protected virtual volume.

Figure 30:
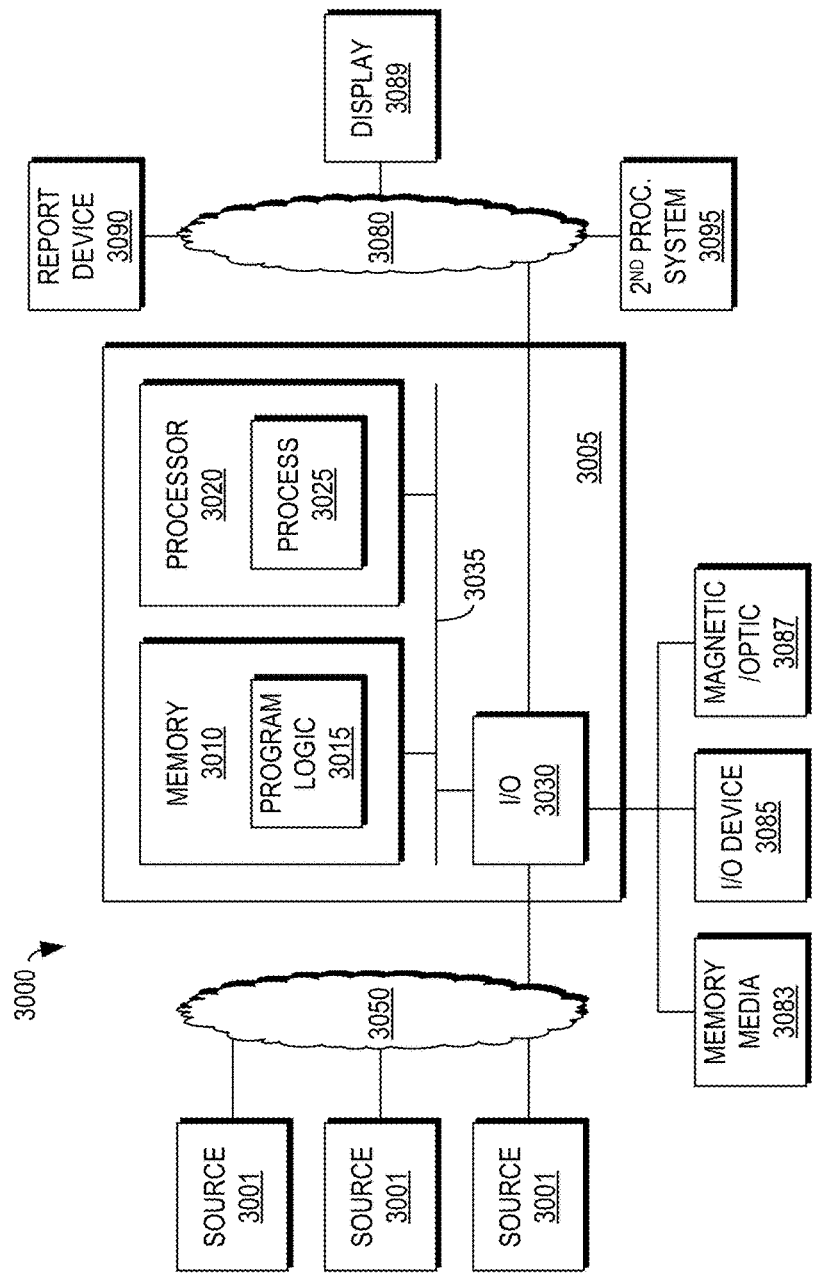
FIG. 30 is a block diagram of an apparatus according to an example embodiment the present invention.

FIG. 30 is a block diagram of an example embodiment apparatus 3005 according to the present invention. The apparatus 3005 may be part of a system 3000 and includes memory 3010 storing program logic 3015, a processor 3020 for executing a process 3025, and a communications I/O interface 3030, connected via a bus 3035.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 30, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 31:
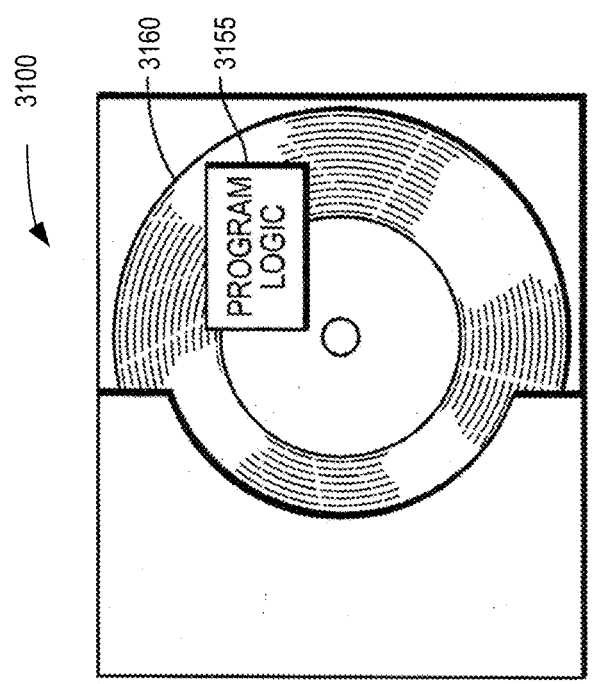
FIG. 31 is a block diagram of a computer program product including program logic, encoded on a computer-readable medium in computer-executable code configured for carrying out the methods of the invention, according to an example embodiment of the present invention.

FIG. 31 is a block diagram of a computer program product 3100 including program logic 3155, encoded on a computer-readable medium 3160 in computer-executable code configured for carrying out the methods of the invention, according to an example embodiment of the present invention. The logic for carrying out the method may be embodied as part of the aforementioned system, which is useful for carrying out a method described with reference to embodiments shown.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A computer-implemented method to automate orchestration of storage for remote data centers comprising:
   receiving, by a storage management API, parameters for creation of a source volume with high availability and data protection, wherein the parameters includes at least one of a storage size, a storage protocol, a source location, and a target location;
   creating the source volume in a first datacenter automatically by the storage management API, the source volume in the first datacenter accessible as a virtual volume exposed to the first datacenter and a second datacenter for high availability of the source volume between the first datacenter and the second datacenter; and
   establishing, by the storage management API, replication of the virtual volume to a third datacenter for data protection of the source volume between the second datacenter and the third datacenter;
   wherein the first datacenter, the second datacenter, and the third datacenter are each in a different geographic location, and further wherein the storage management API to enable automated establishment of virtualized storage automatically over long distances to meet a service level objective;
   wherein creating the source volume in a first datacenter causes creation of a target volume at the second datacenter exposed as a virtual volume at the first datacenter and the second datacenter, a replication target volume at the third datacenter, and journal volumes at the second datacenter and the third datacenter, and
   selecting the source volume for failover; and initiating failover of the replication target volume to the source volume to cause the source volume to operate as an active failover volume.

2. The method of claim 1 wherein creating the source volume in a first datacenter, the source volume in the first datacenter accessible as a virtual volume exposed to the first datacenter and a second datacenter, comprises:
   creating the source volume from a source virtual storage pool in the first datacenter, wherein the source virtual storage pool defines storage attributes for volumes created from the source virtual storage pool; and
   creating a target volume from a target virtual storage pool in the second datacenter, wherein the target virtual storage pool defines storage attributes for volumes created from the target virtual storage pool.

3. The method of claim 2 wherein the source virtual storage pool defines a virtual storage array from which the source virtual storage pool is provisioned, a distributed storage type, and the target virtual storage pool on a target virtual storage array.

4. The method of claim 2 wherein establishing replication of the virtual volume to a third datacenter comprises creating a replication target volume from a replication target storage pool in the third datacenter, wherein the replication target storage pool defines storage attributes for replication target volumes created from the replication target storage pool.

5. The method of claim 4 wherein creating a replication target volume from a replication target storage pool in the third datacenter comprises selecting a replication target storage pool from a target virtual storage pool for the third datacenter for association with replication target volumes to be created at one of the first datacenter and the second datacenter.

6. The method of claim 5 wherein the source volume, the target volume, and the replication target volume are in a consistency group.

7. The method of claim 1 further comprising: selecting the replication target volume for failover; and initiating failover of the target volume to the replication target volume to cause the replication target volume to operate as an active failover volume.

8. A system comprising:
   a first datacenter;
   a second datacenter;
   a third datacenter wherein the first datacenter, the second datacenter, and the third datacenter are each in a different geographic location; and
   computer executable logic configured to enable one or more processors of the system to perform operations of:
   receiving, by a storage management API, parameters for creation of a source volume with high availability and data protection, wherein the parameters includes at least one of a storage size, a storage protocol, a source location, and a target location;
   creating the source volume in the first datacenter automatically by the storage management API, the source volume in the first datacenter accessible as a virtual volume exposed to the first datacenter and the second datacenter for high availability of the source volume between the first datacenter and the second datacenter; and
   establishing, by the storage management API, replication of the virtual volume to the third datacenter for data protection of the source volume between the second datacenter and the third datacenter, wherein the first datacenter, the second datacenter, and the third datacenter are each in a different geographic location, and further wherein the storage management API to enable automated establishment of virtualized storage automatically over long distances to meet a service level objective;
   wherein creating the source volume in a first datacenter causes creation of a target volume at the second datacenter exposed as a virtual volume at the first datacenter and the second datacenter, a replication target volume at the third datacenter, and journal volumes at the second datacenter and the third datacenter; and
   selecting the source volume for failover; and initiating failover of the replication target volume to the source volume to cause the source volume to operate as an active failover volume.

9. The system of claim 8 wherein creating the source volume in a first datacenter, the source volume in the first datacenter accessible as a virtual volume exposed to the first datacenter and a second datacenter, comprises:
   creating the source volume from a source virtual storage pool in the first datacenter, wherein the source virtual storage pool defines storage attributes for volumes created from the source virtual storage pool; and
   creating a target volume from a target virtual storage pool in the second datacenter, wherein the target virtual storage pool defines storage attributes for volumes created from the target virtual storage pool.

10. The system of claim 9 wherein the source virtual storage pool defines a virtual storage array from which the source virtual storage pool is provisioned, a distributed storage type, and the target virtual storage pool on a target virtual storage array.

11. The system of claim 9 wherein establishing replication of the virtual volume to a third datacenter comprises creating a replication target volume from a replication target storage pool in the third datacenter, wherein the replication target storage pool defines storage attributes for replication target volumes created from the replication target storage pool.

12. The system of claim 11 wherein creating a replication target volume from a replication target storage pool in the third datacenter comprises selecting a replication target storage pool from a target virtual storage pool for the third datacenter for association with replication target volumes to be created at one of the first datacenter and the second datacenter.

13. The system of claim 12 wherein the source volume, the target volume, and the replication target volume are in a consistency group.

14. The system of claim 8 wherein the computer executable logic configured to enable one or more processors of the system to perform operations of: selecting the replication target volume for failover; and initiating failover of the target volume to the replication target volume to cause the replication target volume to operate as an active failover volume.

15. A computer program product including a non-transitory computer readable storage medium have computer program code encoded thereon that, when executed on one or more processors of a system, causes the system to automate orchestration of storage for remote datacenters, the computer program code comprising:
    computer program code for receiving, by a storage management API, parameters for creation of a source volume with high availability and data protection, wherein the parameters includes at least one of a storage size, a storage protocol, source location, and a target location;
    computer program code for creating the source volume in a first datacenter, automatically by the storage management API, the source volume in the first datacenter accessible as a virtual volume exposed to the first datacenter and a second datacenter for high availability of the source volume between the first datacenter and the second datacenter; and
    computer program code for establishing, by the storage management API, replication of the virtual volume to a third datacenter for data protection of the source volume between the second datacenter and the third datacenter wherein the first datacenter, the second datacenter, and the third datacenter are each in a different geographic location, and further wherein the storage management API to enable automated establishment of virtualized storage automatically over long distances to meet a service level objective;
    wherein creating the source volume in a first datacenter causes creation of a target volume at the second datacenter exposed as a virtual volume at the first datacenter and the second datacenter, a replication target volume at the third datacenter, and journal volumes at the second datacenter and the third datacenter; and
    selecting the source volume for failover; and initiating failover of the replication target volume to the source volume to cause the source volume to operate as an active failover volume.

16. The computer program product of claim 15 wherein creating the source volume in a first datacenter, the source volume in the first datacenter accessible as a virtual volume exposed to the first datacenter and a second datacenter, comprises:
    creating the source volume from a source virtual storage pool in the first datacenter, wherein the source virtual storage pool defines storage attributes for volumes created from the source virtual storage pool; and
    creating a target volume from a target virtual storage pool in the second datacenter, wherein the target virtual storage pool defines storage attributes for volumes created from the target virtual storage pool.

17. The computer program product of claim 16 wherein the source virtual storage pool defines a virtual storage array from which the source virtual storage pool is provisioned, a distributed storage type, and the target virtual storage pool on a target virtual storage array.

* * * * *